(12) United States Patent
Henmi

(10) Patent No.: US 8,190,924 B2
(45) Date of Patent: May 29, 2012

(54) COMPUTER SYSTEM, PROCESSOR DEVICE, AND METHOD FOR CONTROLLING COMPUTER SYSTEM

(75) Inventor: Masanori Henmi, Kyoto (JP)

(73) Assignee: Panasonic Corporation, Osaka (JP)

( * ) Notice: Subject to any disclaimer, the term of this patent is extended or adjusted under 35 U.S.C. 154(b) by 735 days.

(21) Appl. No.: 12/146,916

(22) Filed: Jun. 26, 2008

(65) Prior Publication Data

US 2009/0006696 A1    Jan. 1, 2009

(30) Foreign Application Priority Data

Jun. 29, 2007   (JP) ................................. 2007-172886

(51) Int. Cl.
*G06F 1/00* (2006.01)
*G06F 5/00* (2006.01)
*G06F 3/12* (2006.01)
*G06F 13/00* (2006.01)
*H04M 1/00* (2006.01)

(52) U.S. Cl. .......... 713/300; 713/322; 710/52; 710/315; 358/1.15; 455/574; 463/43

(58) Field of Classification Search ..................... 710/52, 710/315; 713/300, 322; 358/1.15; 455/574; 463/43
See application file for complete search history.

(56) References Cited

U.S. PATENT DOCUMENTS

| | | | |
|---|---|---|---|
| 6,088,602 | A | 7/2000 | Banister |
| 6,804,503 | B2 | 10/2004 | Shohara et al. |
| 7,039,819 | B1 * | 5/2006 | Kommrusch et al. ......... 713/322 |
| 7,057,754 | B1 * | 6/2006 | Tsuchiya et al. ............. 358/1.15 |
| 7,684,835 | B1 * | 3/2010 | Vu et al. ........................ 455/574 |
| 2003/0011587 | A1 | 1/2003 | Miura |
| 2003/0092493 | A1 * | 5/2003 | Shimizu et al. ................. 463/43 |
| 2003/0200451 | A1 * | 10/2003 | Evans et al. .................... 713/193 |
| 2004/0073723 | A1 * | 4/2004 | Hatano ........................... 710/52 |
| 2004/0153678 | A1 * | 8/2004 | Ahmad et al. ................. 713/322 |
| 2004/0255170 | A1 * | 12/2004 | Yang et al. ..................... 713/300 |
| 2006/0069932 | A1 * | 3/2006 | Oshikawa et al. ............. 713/300 |

(Continued)

FOREIGN PATENT DOCUMENTS

JP              9-044278           2/1997

(Continued)

OTHER PUBLICATIONS

Japan Office action, mail date is Jun. 7, 2011.
English language Abstract of JP 11-305887, Nov. 15, 1999.
English language Abstract of JP 11-3131, Jan. 6, 1999.

*Primary Examiner* — Thomas Lee
*Assistant Examiner* — Aurel Prifti
(74) *Attorney, Agent, or Firm* — Greenblum & Bernstein, P.L.C.

(57) ABSTRACT

A computer system which significantly improves responsiveness to a sleep request includes: a processor device switching between an execution mode and a suspension mode; and an access controlling unit accessing a functional block in response to a command request received from the processor device, wherein, in response to a sleep request signal received from the external device, the processor device responds with a sleep response signal and asserts a suspension notification signal indicating a switch to the suspension mode, and the access controlling unit: masks an input of a further command request after receiving the command request from the processor device, in the case where the processor device has outputted the command request when the access controlling unit receives the suspension notification signal; masks an input of a command request in the case where the processor device has not outputted the command request; and removes the mask when the suspension notification signal is negated.

17 Claims, 16 Drawing Sheets

U.S. PATENT DOCUMENTS

| | | |
|---|---|---|
| 2006/0194624 A1 | 8/2006 | Hsieh et al. |
| 2007/0200451 A1* | 8/2007 | Raoul et al. .................. 310/239 |
| 2007/0254677 A1* | 11/2007 | Venkitaraman et al. ...... 455/458 |
| 2007/0266387 A1 | 11/2007 | Henmi |
| 2007/0283075 A1* | 12/2007 | Patton .......................... 710/315 |
| 2007/0294553 A1* | 12/2007 | Clay et al. .................... 713/322 |
| 2008/0065833 A1 | 3/2008 | Hosoki et al. |
| 2008/0104602 A1 | 5/2008 | Takeuchi |
| 2008/0126905 A1 | 5/2008 | Deguchi et al. |

FOREIGN PATENT DOCUMENTS

| | | |
|---|---|---|
| JP | 10-333772 | 12/1998 |
| JP | 11-003131 | 6/1999 |
| JP | 11-305887 | 11/1999 |
| JP | 3000965 | 11/1999 |
| JP | 11-345129 | 12/1999 |
| JP | 2003-029957 | 1/2003 |
| JP | 2004-264999 | 9/2004 |

* cited by examiner

COMPUTER SYSTEM, PROCESSOR DEVICE, AND METHOD FOR CONTROLLING COMPUTER SYSTEM

BACKGROUND OF THE INVENTION (1) Field of the Invention

The present invention relates to computer systems having a power reduction function, and more particularly to: a computer system including a processor device having an execution mode for receiving a supply of a clock signal and a suspension mode in which the supply of the clock signal is suspended by responding, with a sleep response signal, to a sleep request signal received from an external device; and a method for controlling the computer system.

(2) Description of the Related Art

In recent years, along with a rapid increase of the need for mobile communication appliances such as mobile phones, the need for Large-Scale Integrations (LSI) for the mobile communication appliances has also increased significantly. Further, as the mobile communication appliances become more highly-functioned, it is becoming popular for the LSI of the mobile communication appliances to have a processor capable of performing parallel processing or a multiprocessor having plural processors in a single LSI.

Patent Reference 1, Japanese Unexamined Patent Application Publication No. 11-305887, discloses a method for controlling a microcontroller which does not invalidate processing of a peripheral circuit when switching to a low-power consumption mode. With this controlling method, at first, it is judged whether or not the peripheral circuit is in operation. When it is judged that the peripheral circuit is not in operation, a clock signal for the Central Processing Unit (CPU) and a clock signal for the peripheral circuit are switched to the low-power consumption mode. On the other hand, when it is judged that the peripheral circuit is in operation, the clock signal for the peripheral circuit is switched to the low-power consumption mode after the operation of the peripheral circuit is completed. As a result, this method prevents the processing of the peripheral circuit from being invalidated.

In addition, Patent Reference 2, Japanese Patent No. 3000965, discloses a data processing apparatus which promptly switches from a stand-by mode to a normal operation mode. This data processing apparatus is incorporated in mobile phones and the like and provides a frequency dividing circuit with a frequency division control signal for setting an operating frequency of the clock signal in a halt mode. When a halt instruction is executed and the data processing apparatus switches to the halt mode, it switches the operating frequency of the clock signal, which is to be supplied to the peripheral processing unit, to a low frequency and supplies the clock signal having the switched operating frequency. As a result of this, the power used by the peripheral processing unit is reduced. Besides, when this data processing apparatus switches from the halt mode to the normal operation mode, the frequency of the peripheral processing unit is switched to the normal operation frequency, and therefore, the data processing apparatus can cause the mobile phone to promptly switch from a call stand-by mode to a calling mode.

However, the above described prior arts entail the following problems.

First, with Patent Reference 1, when the microcontroller is making access to a memory or the peripheral circuit, it is not possible to switch to the low-power consumption mode until the access is completed. Even with Patent Reference 2, it is also not possible to switch to the halt mode while the CPU is making access, because the halt instruction cannot be executed until the access is competed. Consequently, this causes a problem that the power consumption cannot be reduced until the access is completed. To put it differently, the time period of the low-power consumption mode or the halt mode is short, which results in a problem that the power consumption cannot be sufficiently reduced.

Second, with Patent Reference 2, a low-frequency clock signal is supplied to the peripheral processing unit in the halt mode, however, when the peripheral processing unit includes a timer or a counter, the time measurement cannot be performed accurately. As a consequence, there is a problem that when the data processing apparatus performs real-time processing, the timing to start the processing is delayed, and thus the processing performance cannot be guaranteed and the real-time processing cannot always be performed accurately.

SUMMARY OF THE INVENTION

In view of the above described problems, a first object of the present invention is to provide a computer system which significantly improves the responsiveness to a request from an external device for switching to the low-power consumption mode, thereby further reducing the power consumption.

Also, a second object of the present invention is to provide a computer system which does not cause performance degradation from switching to and from the low-power consumption mode.

In order to solve the above described problems, the computer system according to the present invention is a computer system comprising: a processor device having an execution mode and a suspension mode, the execution mode being a mode for executing a program, and the suspension mode being a mode for suspending the program execution by responding, with a sleep response signal, to a sleep request signal received from an external device; and an access controlling unit which accesses a functional block in response to a command request issued by the processor device, and asserts, to the processor device, a command reception signal responding to the command request, wherein, in response to the sleep request signal, the processor device responds to the external device with the sleep response signal, and asserts, to the access controlling unit, a suspension notification signal indicating a switch to the suspension mode, and when the suspension notification signal is received, the access controlling unit is which withholds asserting the command reception signal to the processor device as a response to the command request. With this structure, it is possible to achieve the first object. In other words, even when the processor device is waiting to receive a command reception signal at the time of receiving a sleep request signal, that is, even when the access control unit is currently making access at the time of receiving a sleep request signal, the processor device can immediately respond to the sleep request with a sleep response signal, and therefore, it is possible to significantly improve the responsiveness to the sleep request, and to further reduce the power consumption.

Here, it may be that the access controlling unit includes a masking unit which masks an input of a command request, and through which the access controlling unit: masks, in the case where the processor device has outputted the command request when the access controlling unit receives the suspension notification signal, an input of a further command request after receiving the command request from the processor device; masks an input of a command request in the case where the processor device has not outputted the command request when the access controlling unit receives the suspension notification signal; and removes the mask when the suspension notification signal is negated. With this structure, receiving the suspension notification makes it possible for the access controlling unit to recognize that the processor device has entered the suspension mode, and further, masking the input of further command requests makes it possible for the access controlling unit to prevent acceptance of duplicated command requests by error. The access itself is executed by the access controlling unit, rather than by the processor device.

Here, it may be that supply of a clock signal to the processor device is suspended in the suspension mode.

Here, it may be that the access controlling unit asserts a suspension notification reception signal to the processor device in response to the suspension notification signal from the processor device, and in the case where the processor device has received the sleep request signal and is waiting to receive the command reception signal from the access controlling unit, the processor device responds with the sleep response signal after receiving the suspension notification reception signal from the access controlling unit as a response to the suspension notification signal. The assertion of the suspension notification reception signal may be delayed, only in the case where memory access of the processor device cannot be accepted since a memory accessing unit which accesses the memory is busy, for example.

Here, it may be that the computer system comprises: a host Central Processing Unit (CPU) which asserts the sleep request signal to the processor device, and receives the sleep response signal from the processor device; and a clock supplying unit which supplies a clock signal to the processor device, wherein, when the sleep response signal is received, the host CPU controls the clock supplying unit so that the clock supplying unit suspends the supply of the clock signal. With this structure, the processor device can immediately respond to the sleep request received from the host CPU, and thus it is possible to further reduce the power consumption.

Here, it may be that: the host CPU controls the clock supplying unit so that the clock supplying unit resumes the supply of the clock signal; and the host CPU negates the sleep request signal. With this structure, the host CPU can cause the processor device to switch back to the operation mode from the suspension mode with simple control.

Here, it may be that the access controlling unit includes: a command executing unit which receives the command request from the processor device and from at least an other processor device, and to execute access in response to the received command request; a shared buffer which holds read data accessed in response to the command request; and a judging unit which judges whether or not available capacity of the shared buffer is equal to or greater than a threshold, and defers the assertion of the suspension notification reception signal to the processor device in the case of judging that the available capacity is equal to or less than the threshold when the suspension notification signal is received. With this structure, in addition to the processor device, the computer system can include one or more processors accessing the memory, which improves the expandability of the computer system. In this case, the memory accessing unit executes the memory access for the processor device and of the one or more processors. The memory accessing unit may delay the assertion of the suspension notification reception signal, only in the case where command requests from the processor device cannot be accepted due to conflicts between plural command requests. Also, by using the buffer as a shared buffer instead of using it as a dedicated buffer of the processor device, it is possible to suppress expansion of the circuit size.

Here, it may be that in the case where the sleep request signal is negated and the processor device is waiting to receive the command reception signal, the processor device receives the command reception signal from the access controlling unit. With this structure, the processor device receives the command reception signal when the sleep request signal is negated, and thus the processor device can complete the processing associated with the command request issued prior to switching to the suspension mode.

Here, it may be that the computer system is a computer system comprising: a processor device having an execution mode and a first suspension mode, the execution mode being a mode for receiving supply of a first clock signal, and the first suspension mode being a mode in which the supply of the first clock signal is suspended by responding, with a sleep response signal, to a sleep request signal; a first clock supplying unit which supplies the first clock signal to the processor device; a host Central Processing Unit (CPU) which asserts the sleep request signal to the processor device, and causes the first clock supplying unit to suspend the supply of the first clock signal to the processor device when the sleep response signal is received as a response to the sleep request signal; and an access controlling unit which accesses a functional block in response to a command request issued by the processor device, and asserts, to the processor device, a command reception signal after the access is completed, wherein the processor device: asserts the sleep response signal in the case of receiving the sleep request signal and not waiting to receive the command reception signal from the access controlling unit; and responds to the sleep request with the sleep response signal and asserts, to the access controlling unit, a suspension notification signal indicating a switch to the first suspension mode, in the case of receiving the sleep request signal and waiting to receive the command reception signal from the access controlling unit, the processor device includes: a processor unit having the execution mode and a second suspension mode, the execution mode being a mode for executing programs by time division multiplexing and a mode in which the first clock signal is supplied, and the second suspension mode being a mode in which the supply of the first clock signal is suspended; a counting unit which counts a time period allocated to a currently executed program; a controlling unit which controls switching of the processor unit between the execution mode and the second suspension mode; and a second clock supplying unit which receives the first clock signal from the first clock supplying unit, and supplies the first clock signal and a second clock signal having a cycle K times as long as a cycle of the first clock signal, the controlling unit controls the second clock supplying unit so that the processor unit is switched to the second suspension mode when a remaining time of the counting unit is other than 0 and the currently executed program has completed necessary processing within the allocated time period, the second clock supplying unit, in the second suspension mode, suspends the supply of the first clock signal to the processor unit and supplies the second clock signal to the counting unit and the controlling unit, and the counting unit counts one by one in the execution mode, and K by K in the second suspension mode. With this structure, it is possible to achieve the second object in addition to the first object. The counting unit counts one by one in the operation mode, and counts K by K in the second suspension mode with the second clock signal which is K times as slow as the first clock signal. Consequently, the time counted in the second suspension mode approximately matches the time counted in the operation mode. As a result, when the real-time processing is performed in accordance with the time counted, it is possible to ensure the necessary performance without causing the performance degradation from switching to and from the low-power consumption mode.

Furthermore, the processor device according to the present invention may be a processor device comprising, a processor unit having an execution mode and a suspension mode, the execution mode being a mode for executing programs by time division multiplexing and a mode in which a first clock signal is supplied, and the suspension mode being a mode in which the supply of the first clock signal is suspended; a counting unit which counts a time period allocated to a currently executed program; a controlling unit which controls switching of the processor unit between the execution mode and the suspension mode; and a clock supplying unit which supplies the first clock signal and a second clock signal having a cycle K times as long as a cycle of the first clock signal, wherein the controlling unit controls the clock supplying unit so that the processor unit is switched to the suspension mode when a remaining time of the counting unit is other than 0 and the currently executed program has completed necessary processing within the allocated time period, the clock supplying unit, in the suspension mode, suspends the supply of the first clock signal to the processor unit and supplies the second clock signal to the counting unit and the controlling unit, and the counting unit counts one by one in the execution mode, and K by K in the suspension mode. With this structure, it is possible to achieve the second object. The counting unit counts one by one in the operation mode, and counts K by K in the second suspension mode using the second clock signal which is K times as slow as the first clock signal. Consequently, the time counted in the second suspension mode approximately matches the time counted in the operation mode. As a result, when the real-time processing is performed in accordance with the time counted, it is possible to ensure the necessary performance without causing the performance degradation from switching to and from the low-power consumption mode.

Here, it may be that the controlling unit switches the second clock signal to the first clock signal when a count value of the counting unit becomes less than K in the suspension mode, the second clock signal being supplied from the clock supplying unit to the counting unit, and the counting unit, when the count value becomes less than K, changes a subtraction number from K to 1 so as to subtract the count value one by one in the suspension mode. Consequently, the time counted in the second suspension mode approximately matches the time counted in the operation mode. As a result, this provides an adequate condition for performing real-time processing having stricter time restrictions.

Here, it may be that K is a power of 2. With this structure, it is possible to simplify the structure of the counting unit.

Here, it may be that the controlling unit includes a control register which can be set by the processor unit, and while the control register holds a predetermined flag value, the controlling unit does not switch from the second clock signal to the first clock signal and the counting unit does not change the subtraction number from K to 1 when the count value of the counting unit becomes less than K in the suspension mode. With this structure, it is possible to select whether to count one by one or to count K by K when the count value of the counting unit becomes less than K in the suspension mode, based on the flag value of the control register. As a result, depending on the processing performance requested by the program to be executed (whether or not the time restriction on the real-time performance is strict), it is possible to flexibly select the counting accuracy of the counting unit.

Here, it may be that the controlling unit, in the suspension mode: temporarily switches the second clock signal to the first clock signal and causes the clock supplying unit to temporarily supply the first clock signal to the processor unit, the second clock signal being supplied from the clock supplying unit to the counting unit; instructs the processor unit to execute context transfer; and switches, when the context transfer is completed, the first clock signal back to the second clock signal and causes the clock supplying unit to suspend the supply of the first clock signal to the processor unit, the first clock signal being supplied from the clock supplying unit to the counting unit. With this structure, it is possible to ensure the necessary performance without delaying the start timing of the program to be switched to, since the context transfer is performed at high speed in the suspension mode using the first clock signal.

Furthermore, the system LSI, the mobile phone, and the method for controlling the computer system according to the present invention are structured in a manner similar to the structure described above.

According to the present invention, firstly, it is possible to significantly improve the responsiveness to a request received from an external device for switching to the low-power consumption mode, and thus the power consumption can be further reduced. Also, the expandability of the computer system can be improved, and it is possible to suppress expansion of the circuit size.

Secondly, it is possible to prevent performance degradation caused by switching to and from the low-power consumption mode.

It is possible to approximately match the time counted in the suspension mode and the time counted in the operation mode.

It is also possible to completely match the time counted in the suspension mode and the time counted in the operation mode.

When the real-time processing is performed, it is possible to ensure the necessary performance without causing the performance degradation from switching to and from the low-power consumption mode.

This provides an adequate condition for performing real-time processing having stricter time restrictions.

Depending on the processing performance requested by the program to be executed (whether or not the time restriction on the real-time performance is strict), it is possible to flexibly select the counting accuracy of the counting unit.

FURTHER INFORMATION ABOUT TECHNICAL BACKGROUND TO THIS APPLICATION

The disclosure of Japanese Patent Application No. 2007-172886 filed on Jun. 29, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Hereinafter, with reference to the drawings, embodiments of the present invention shall be described in detail.

First Embodiment

A computer system according to a first embodiment is a system for performing computation, and mainly includes a processor device and an access controlling unit. The access controlling unit receives a command request issued by the processor device, and accesses functional blocks such as a memory and an input/output (I/O) device in response to the received command request. Further, the access controlling unit employs a split method in which the bus is temporarily released between the reception of the command request and the transmission and reception of data.

The processor device has an execution mode for receiving a supply of a clock signal and a first suspension mode in which the supply of the clock signal is suspended by responding, with a sleep response signal, to a sleep request signal received from an external device.

For a switch from the execution mode to the first suspension mode, the processor device, having received a sleep request signal from an external device, responds with a sleep response signal and outputs a suspension notification signal indicating a switch to the first suspension mode, even when it is in access to the access controlling unit.

In the case where the processor device had outputted a command request by the time when the access controlling unit receives the suspension notification signal, the access controlling unit masks the input of further command requests after receiving the outputted command request. In the case where the processor device had not outputted a command request, the access controlling unit masks the input of command requests. After that, when the suspension notification signal is negated, the access controlling unit removes the mask. Masking the input of command requests is to prevent reception of duplicated command requests by error.

As described above, the processor device can significantly improve the responsiveness to a sleep request signal because it immediately responds with a sleep response signal even while accessing the access controlling unit, and therefore, further reduction of the power consumption is possible. By receiving the suspension notification, the access controlling unit can recognize that the processor device has entered the first suspension mode, and thus the access is executed by the access controlling unit rather than the processor device. The suspension notification signal is transmitted in order to prevent the access controlling unit from outputting a signal requiring a handshake and the like to the processor device while the processor device is in the suspension mode.

Figure 1:
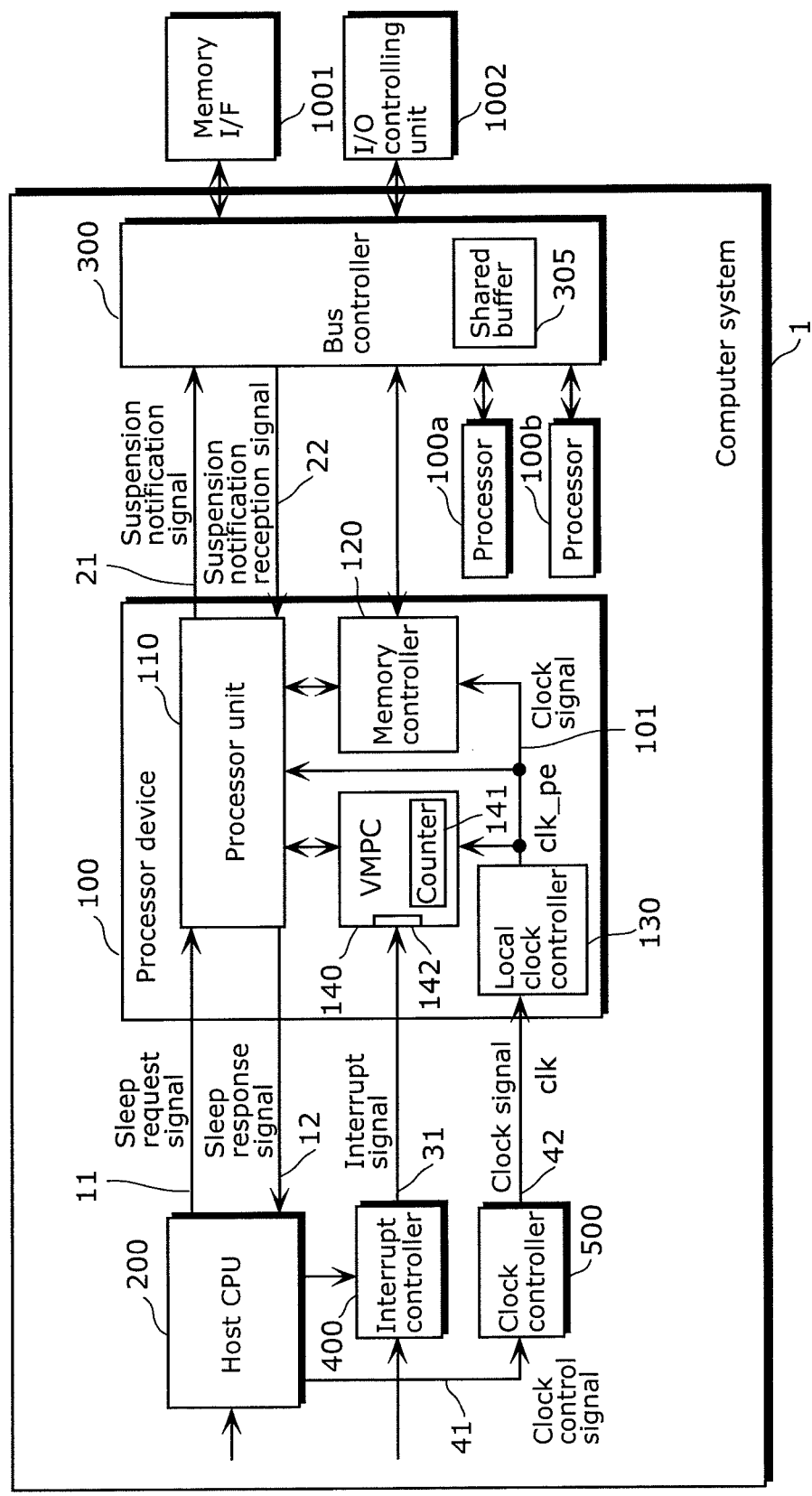
FIG. 1 is a block diagram illustrating an entire structure of a computer system according to a first embodiment.

FIG. 1 is a functional block diagram illustrating an entire structure of the computer system according to the first embodiment of the present invention. As shown in the figure, a computer system 1 includes: a processor device 100; a host CPU 200; a bus controller 300 functioning as the access controlling unit; an interrupt controller 400; a clock controller 500 functioning as a first clock supplying unit; and others such as processors 100*a* and 100*b*.

The processor device 100 has a first suspension mode and a second suspension mode as power-saving modes. The first suspension mode is also simply called a sleep mode. In the first suspension mode, the supply of a clock signal clk 42 is suspended by responding, with a sleep response signal 12, to a sleep request signal 11 received from an external device. That is, the operation of the entire processor device 100 is suspended. Here, the sleep response signal 12 is used as a sleep acknowledge signal for acknowledging a sleep request. The second suspension mode is also called a microsleep mode. In the second suspension mode, the processor device 100 suspends the operations of a processor unit 110 and of a memory controller 120. However, in the microsleep mode, the clock signal continues to be supplied to a Virtual Multi Processor (VMP) controller 140 so as to switch a program at every allocated time. The microsleep mode shall be described in detail in a second embodiment, and therefore shall not be described in the first embodiment.

The host CPU 200 outputs the sleep request signal 11 to the processor device 100, and when the sleep response signal 12 is received as a response to the sleep request signal 11, it suspends the supply of the first clock signal from the clock controller 500 to the processor device.

The bus controller 300 performs the following: receives a command request issued by the processor device 100 and the processors 100*a* and 100*b*; accesses the memory in response to the received command request; transmits a write data reception signal to the processor device 100 in the case of write accessing; and transmits read data and a read data valid signal to the processor device 100 in the case of read accessing. Note that the memory access includes, not only the memory reading and memory writing performed via a memory I/F 1001, but also the I/O reading and I/O writing performed via an I/O controlling unit 1002. Further, the target to be accessed is called a functional block. The memory I/F 1001 is connected to such a high-capacity memory as a Synchronous Dynamic Random Access Memory (SDRAM) as the functional block. The I/O controlling unit 1002 is connected to a Secure Digital (SD) memory card, an inputting apparatus, an outputting apparatus, and so on as functional blocks. Further, memory access is synonymous with bus access. The bus controller 300, having received a suspension notification signal 21 from the processor device 100, outputs a suspension notification reception signal 22 to the processor device 100 in the case where the bus controller 300 can accept suspension notification signal 21. Whether or not the bus controller 300 can accept suspension notification signal 21 depends on whether or not a shared buffer 305 has an available capacity value equal to or greater than a threshold. The threshold may be the size of read data requested by the command request, or a predetermined value, for example.

The interrupt controller 400 notifies the processor device 100 of an interrupt from the host CPU 200 or an external I/O, as an interrupt signal 31.

The clock controller 500 supplies or suspends supplying the clock signal clk 42 to a local clock controller 130, under the control of the host CPU 200.

The processor device 100 includes the processor unit 110, the memory controller 120, the local clock controller 130, and the VMP controller 140.

The processor unit 110 performs parallel processing by way of time division multiplexing, under the control of the VMP controller 140.

The memory controller 120 issues a command request signal 23 to the bus controller 300 in response to the memory access signal from the processor unit 110. When the access is completed, the memory controller 120 notifies the processor unit 110 of the access completion.

The following shall describe schematic procedures for switching the processor device 100 to the sleep mode. Firstly, the host CPU 200 asserts the sleep request signal 11 to the processor device 100. When the sleep request signal 11 is asserted, the processor device 100 starts processing for suspending the execution of a program in the processor device 100. Further, it is checked whether or not the processor device 100 is making outgoing access, that is, memory access to the bus controller 300. In the case where the processor device 100 is making memory access, the processor device 100 outputs a suspension notification signal 21 to the bus controller 300, and then asserts the sleep response signal 12 to the host CPU 200. After the sleep response signal 12 is asserted, the host CPU 200 suspends the supply of the clock signal clk 42 to the processor device 100 via the clock controller 500.

The VMP controller 140 includes a counter 141 and an interrupt detector 142.

The VMP controller 140 is a context switching apparatus for switching contexts for the processor unit 110 to perform parallel processing by way of time division multiplexing. Here, contexts refer to information necessary for switching programs. More specifically, contexts refer to control information of a program counter, a flag register, a stack area, and the like, and to data information of a general-purpose register, and the like. The switching of the contexts refers to the operations of writing the contexts of the currently executed program to the memory (called "saving") and reading the contexts of the next program to be executed from the memory (called "restoring"). The VMP controller 140 has a function to schedule the saving processing and the restoring processing, and the program to be executed, as the context switching apparatus.

The counter 141 counts the time allocated to each program for time division multiplexing.

The interrupt detector 142 receives an interrupt signal 31 from the interrupt controller 400 so as to detect an interrupt. This interrupt serves as a trigger to stop the microsleep mode.

Figure 2:
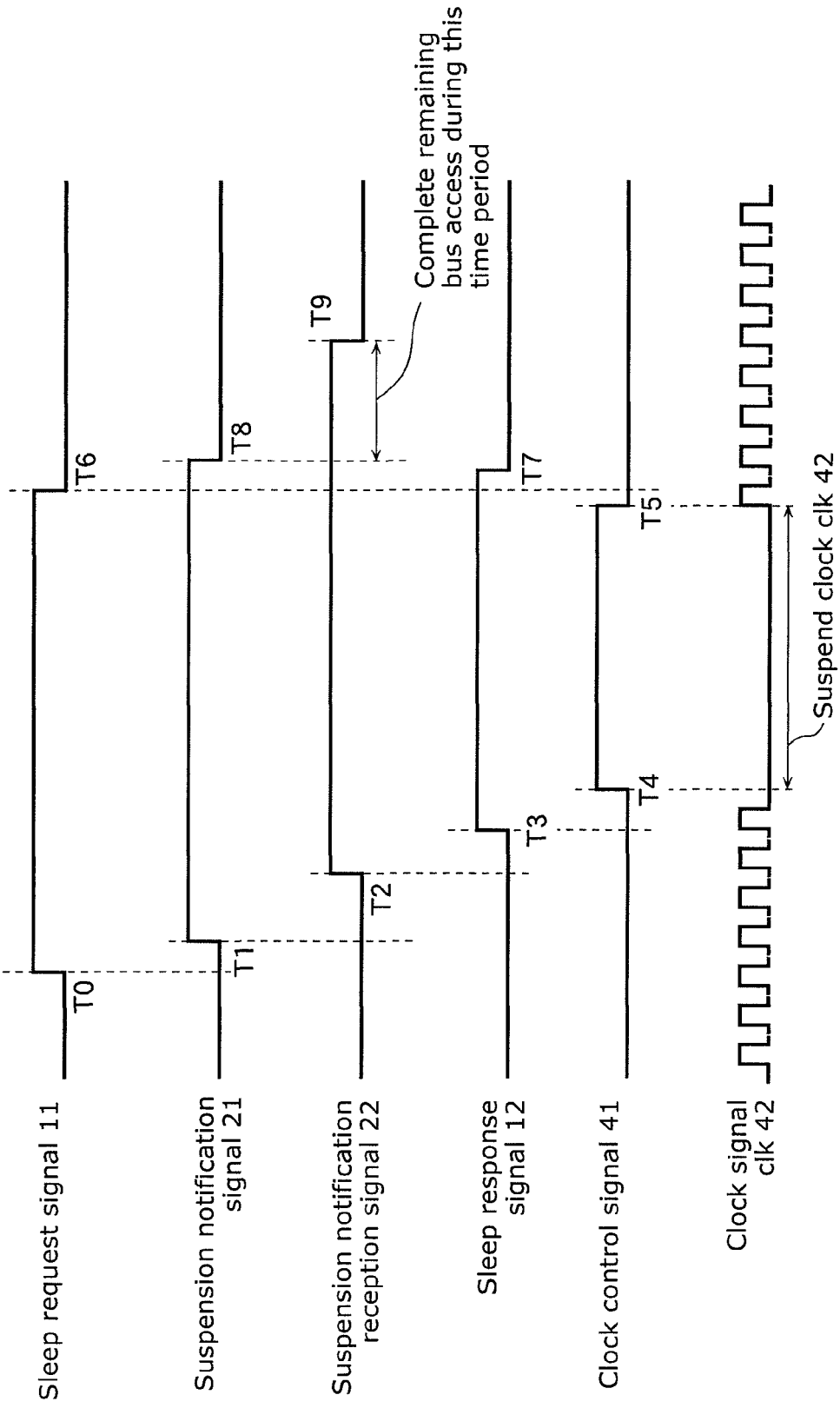
FIG. 2 is a timing chart illustrating switching of a processor device 100 between an execution mode and a sleep mode.
Figure 15:
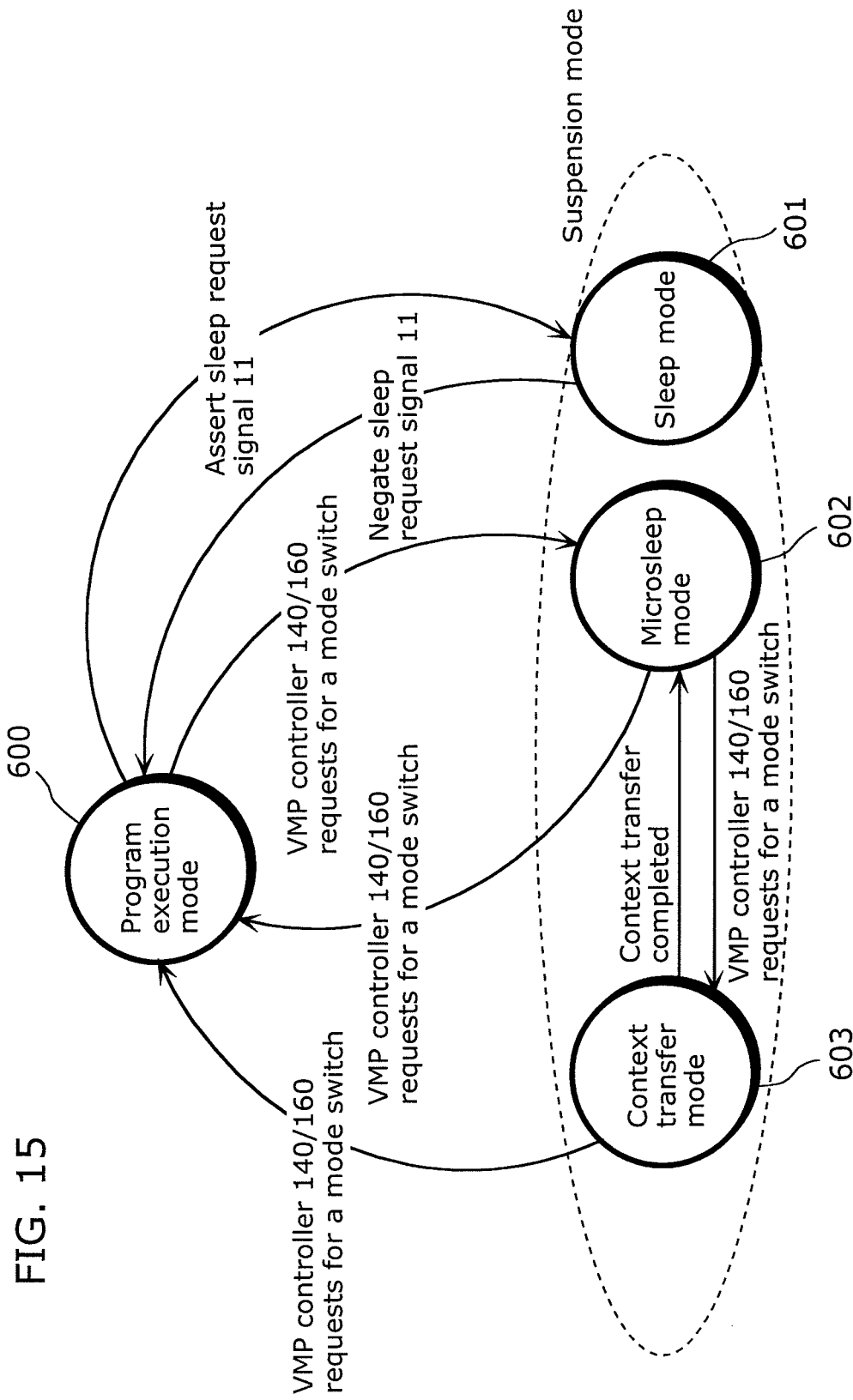
FIG. 15 is a diagram illustrating mode switching of the processor device.

FIG. 2 is a timing chart illustrating the switching of the processor device 100 between the execution mode and the sleep mode. Further, FIG. 15 is a diagram illustrating the mode switching of the processor device 100.

At first, the following shall describe operations when the processor device 100 switches from a program execution mode 600 to a sleep mode 601.

In FIG. 2, the host CPU 200 asserts the sleep request signal 11 to the processor device 100 which is in the program execution mode 600, in order to suspend the program execution (timing T0). When the sleep request signal 11 is asserted, the processor device 100 performs processing to switch to the mode for suspending the program execution (the sleep mode 601). Then, the processor device 100 asserts the sleep response signal 12 (timing T3) so as to switch to the sleep mode 601.

In doing so, the processor device 100 asserts the suspension notification signal 21 to be outputted to the bus controller 300 (timing T1).

In the case where the suspension notification signal 21 is asserted during memory access, the bus controller 300 temporarily suspends the input and output of signals to and from the processor device 100 and the memory I/F 1001 and the I/O controlling unit 1002, and asserts the suspension notification reception signal 22 (timing T2). At this point in time, in the case where the access data for the memory I/F 1001 or the I/O controlling unit 1002 needs to be held by the bus controller 300, it is stored in the shared buffer 305 provided in the bus controller 300. When the suspension notification reception signal 22 is asserted, the processor device 100 asserts the sleep response signal 12 to be outputted to the host CPU 200 (timing T3), so as to switch to the sleep mode 601.

When the sleep response signal 12 is asserted, the host CPU 200 asserts a clock control signal 41 to the clock controller 500 (timing T4). When the clock control signal 41 is asserted, the clock controller 500 suspends the clock of the clock signal clk 42 supplied to the processor device 100.

As described above, the present invention has a feature of suspending the supply of the clock signal to the processor device 100, without waiting for the completion of the memory access.

Next, the following shall describe the operations when the processor device 100 switches back to the program execution mode 600 from the sleep mode 601.

First, the host CPU 200 negates the clock control signal 41 (timing T5). At this timing, the clock controller 500 supplies the clock signal clk 42 to the processor device 100. After that, the host CPU 200 negates the sleep request signal 11 outputted to the processor device 100 (timing T6). When the sleep request signal 11 is negated, the processor device 100 performs processing to switch to the program execution mode 600 from the sleep mode 601. Here, in the case where the processor device 100 has not been asserting the suspension notification signal 21, it negates the sleep response signal 12 (timing T7) after the completion of this processing, so as to switch to the program execution mode 600.

On the other hand, in the case where the processor device 100 has been asserting the suspension notification signal 21, it negates the suspension notification signal 21 outputted to the bus controller 300 (timing T8).

When the suspension notification signal 21 is negated, the bus controller 300 resumes the temporarily suspended input and output of signals to and from the processor device 100 and the memory I/F 1001 and the I/O controlling unit 1002.

Then, after the memory access for the processor device 100 is completed, the bus controller 300 negates the suspension notification reception signal 22 (timing T9) so as to switch to the program execution mode 600.

Figure 3:
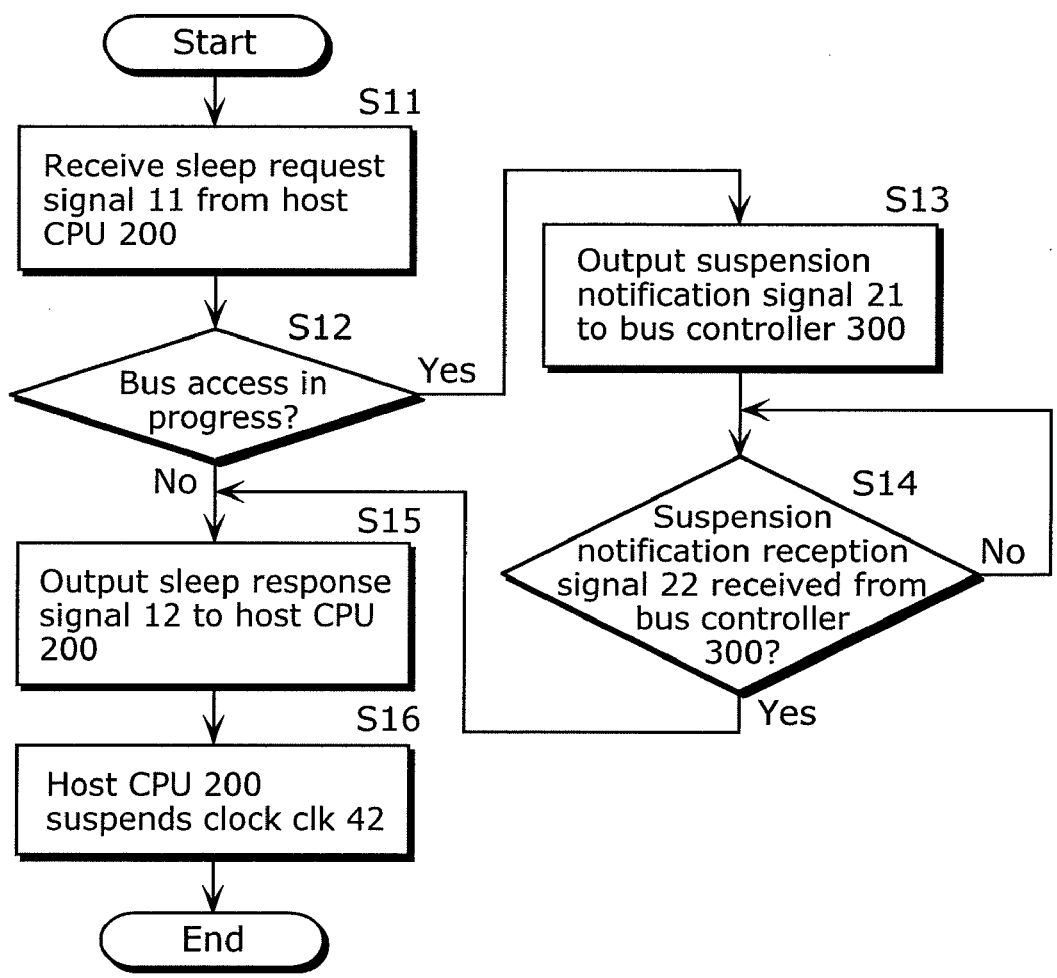
FIG. 3 is a schematic flow chart illustrating processing for switching to a sleep mode 601.

FIG. 3 is a schematic flow chart illustrating processing for causing the processor device 100 to switch from the program execution mode 600 to the sleep mode 601 and for suspending the clock signal clk 42.

In the figure, when the processor device 100 receives the sleep request signal 11 from the host CPU 200 (S11), it judges whether or not bus access is currently in progress (S12). In the case of judging that bus access is currently in progress, the processor device 100 performs the following: asserts the suspension notification signal 21 to the bus controller 300 (S13); receives the suspension notification reception signal 22 asserted by the bus controller 300 (S14); and then makes a response to the host CPU 200 by asserting the sleep response signal 12 (S15). On the other hand, in the case of judging that bus access is not currently in progress, the processor device 100 immediately makes a response to the host CPU 200 by asserting the sleep response signal 12 (S15). Having received the sleep response signal 12, the host CPU 200 controls the clock controller 500 so as to suspend the supply of the clock signal clk 42 (S16).

Figure 4:
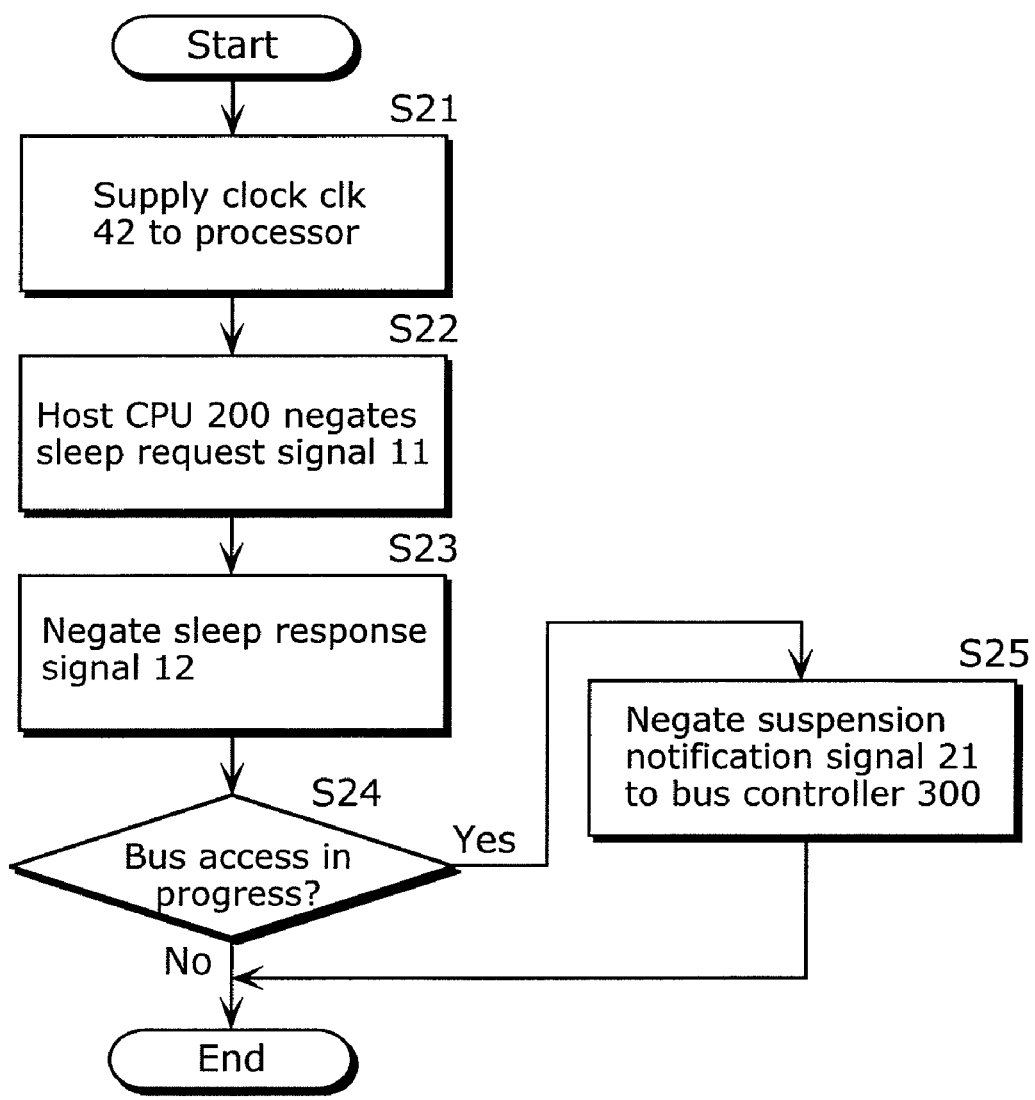
FIG. 4 is a schematic flow chart illustrating processing for switching back to a program execution mode 600.

FIG. 4 is a schematic flow chart illustrating processing for causing the processor device 100 to switch back to the program execution mode 600 from the sleep mode 601.

In the figure, in order to stop the sleep mode of the processor device 100, the host CPU 200 at first controls the clock controller 500 to resume the supply of the clock signal clk 42 (S21) and negates the sleep request signal 11 (S22). When the sleep request signal 11 is negated, the processor device 100 performs processing to switch to the program execution mode 600 from the sleep mode 601 (S23). Here, in the case where the processor device 100 has been asserting the suspension notification signal 21, it negates the suspension notification signal 21 outputted to the bus controller 300 (S25).

Figure 5:
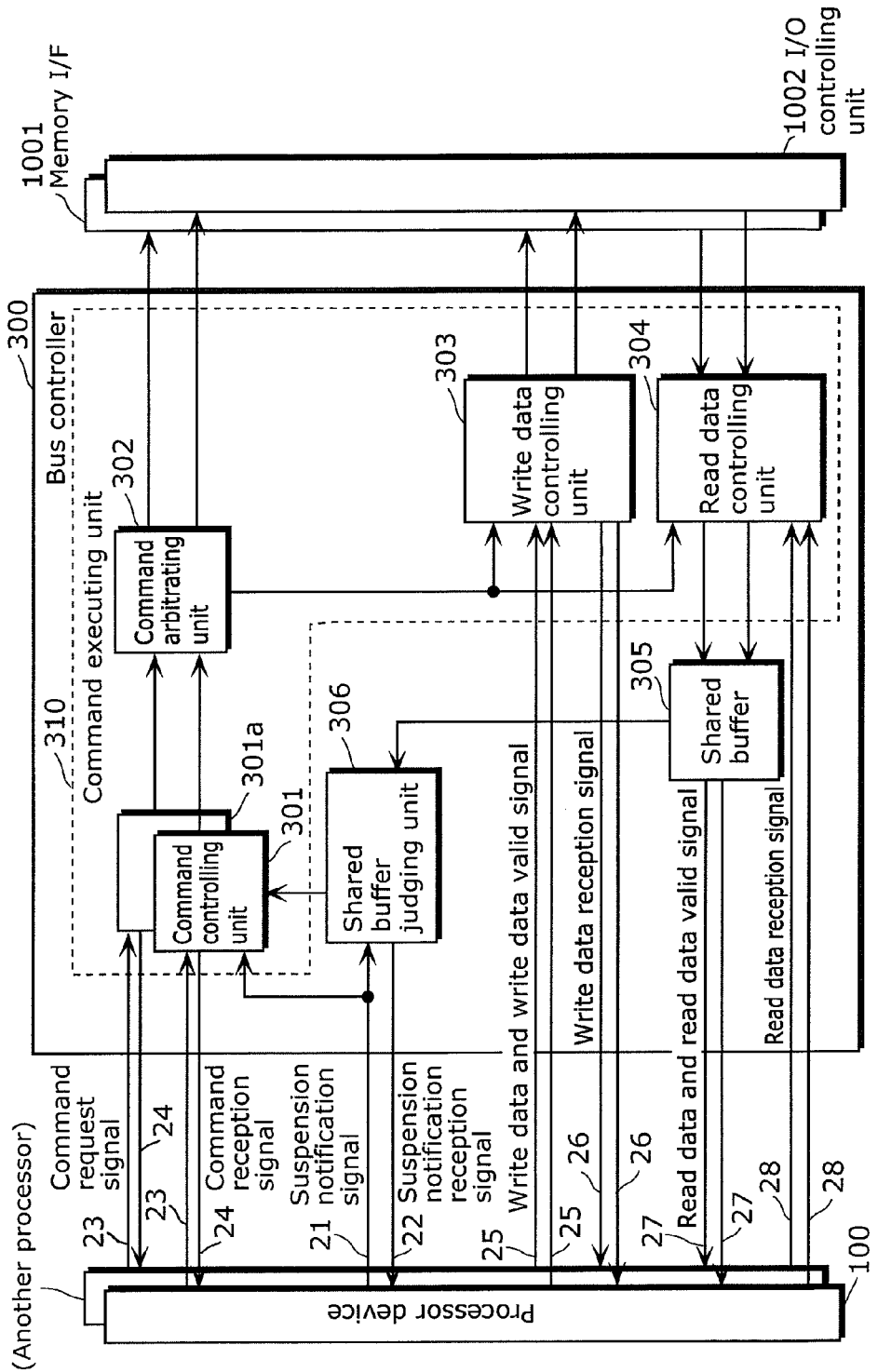
FIG. 5 is a block diagram illustrating a detailed structure of a bus controller 300.

FIG. 5 is a block diagram illustrating a detailed structure of the bus controller 300. As shown in the figure, the bus controller 300 includes the shared buffer 305, a shared buffer judging unit 306, and a command executing unit 310. The command executing unit 310 includes command controlling units 301 and 301a, a command arbitrating unit 302, a write data controlling unit 303, and a read data controlling unit 304.

The shared buffer 305 temporarily holds read data accessed in response to a command request issued by the processor device 100, the processor 100a, and the processors 100b. The shared buffer 305 is shared by processors connected to the bus controller 300, such as the processor device 100, and the processors 100a and 100b. The shared use of the shared buffer 305 allows reduction of the footprint of the bus controller 300.

The shared buffer judging unit 306 judges whether or not the available capacity of the shared buffer is equal to or greater than a threshold. The threshold may be the size of read data requested by the most recent command request, or a predetermined value. When the suspension notification signal 21 is received, the shared buffer judging unit 306 immediately transmits the suspension notification reception signal 22 to the processor device 100 in the case where the available capacity is equal to or greater than the threshold. On the other hand, in the case where the available capacity is not equal to or greater than the threshold, the shared buffer judging unit 306 defers the transmission of the suspension notification reception signal 22 to the processor device 100. Here, the bus controller 300 may include a buffer dedicated for the processor device 100 instead of the shared buffer 305, and transmit the suspension notification reception signal 22 without the above described judgment.

The command executing unit 310 executes memory access in response to a command request from the processor device 100, for example.

The command controlling unit 310 holds the command request issued by the processor device 100. To be more specific, in the case where the processor device 100 is asserting a command request signal 23 when the command controlling unit 301 receives the suspension notification signal 21, the command controlling unit 301, after receiving (holding internally) the command request signal 23, masks the input of further command request signals 23. On the other hand, in the case where the processor device 100 is not asserting a command request signal 23 when the command controlling unit 301 receives the suspension notification signal 21, the command controlling unit 301 masks the input of command request signals 23. Subsequently, the command controlling unit 301 removes the mask after the suspension notification signal 21 is negated. A command controlling unit 310a is the same as the command controlling unit 310 except that the command controlling unit 310a holds command requests issued by the processor 100a. The number of these command controlling units provided is the same as the number of the processors connected to the bus controller 300.

The command arbitrating unit 302 arbitrates conflicts of command requests issued by the plural command controlling units, and selects a single command request as a result of the arbitration. The selected command request is outputted as an access control signal to the memory via the memory I/F 1001 or to the I/O via the I/O controlling unit 1002.

In the case where the command request selected by the command arbitrating unit 302 is a request for write access, the write data controlling unit 303 selects write data which has been outputted by the processor device 100, the processor 100a, or the like and which corresponds to the selected command request.

The read data controlling unit 304 selects the data read from the memory via the memory I/F 1001 or from the I/O via the I/O controlling unit 1002, and stores it in the shared buffer 305.

Figure 6:
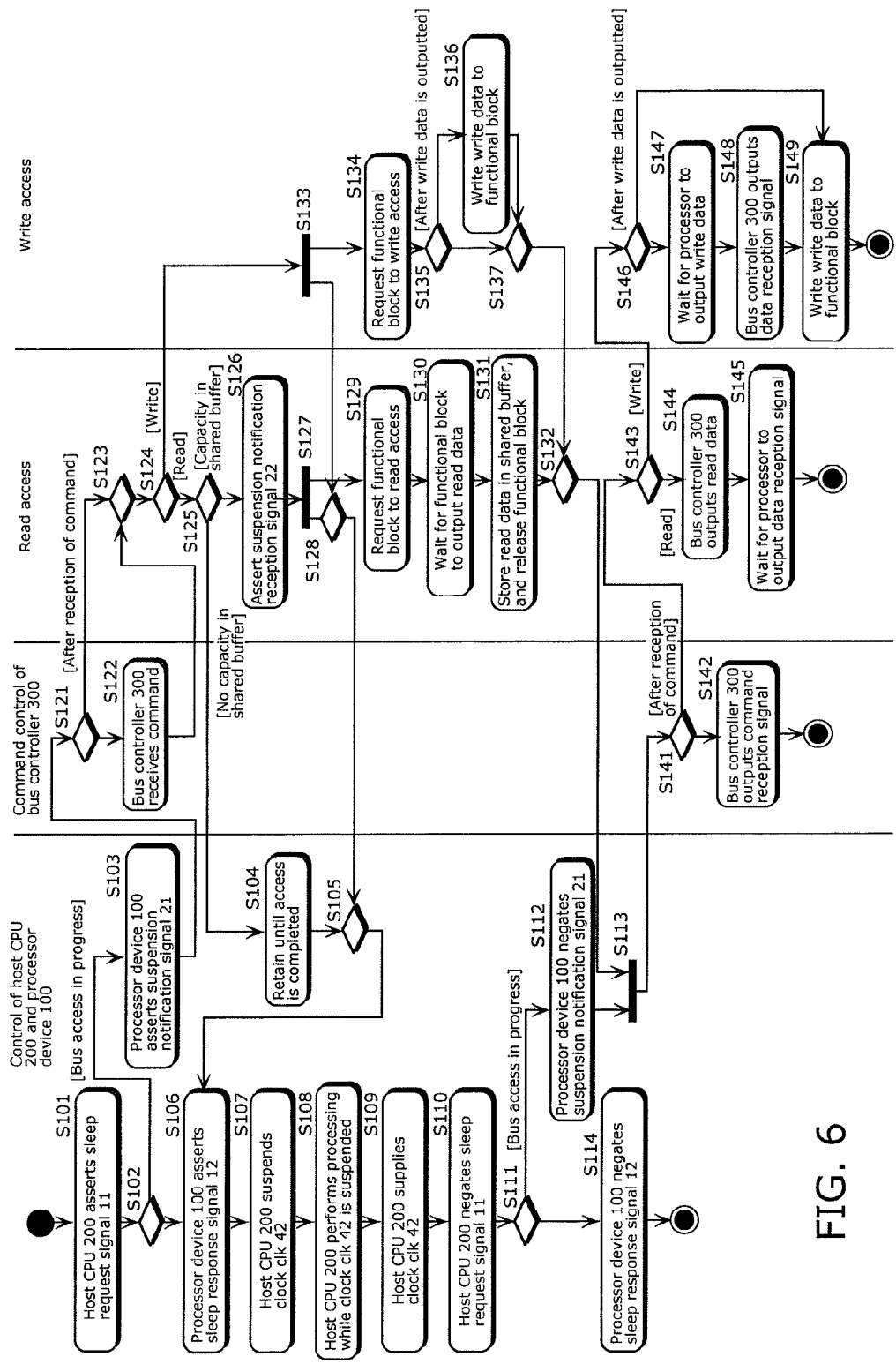
FIG. 6 is a flow chart illustrating in detail processing for switching to the sleep mode and further switching back to the program execution mode.

FIG. 6 is a flow chart illustrating in detail processing for causing the processor device 100 to switch from the program execution mode 600 to the sleep mode 601 and to further switch back to the program execution mode 600. The first column from the left of the figure illustrates a flow of the processing performed by the host CPU 200 and the processor device 100. The second column from the left illustrates a flow of command request control, performed by the bus controller 300, common to read accesses and write accesses. The third column from the left illustrates a flow of read access control performed by the bus controller 300. The fourth column from the left illustrates a flow of write access control performed by the bus controller 300. The black circle in the figure denotes the start of the processing. The black circles surrounded by another circle denote the end of the processing. The thick bar with two inputs and one output (S113, for example) denotes that two signals or conditions become ready. The thick bars with one input and two outputs (S127, for example) denote that a single signal or condition is divided into two. The rhombuses with two inputs and one output (S105, for example) denote a passing point for one of the inputs. The rhombuses with one input and two outputs (S124, for example) denote a judgment. The functional block mentioned in the figure is either the memory I/F 1001 or the I/O controlling unit 1002.

Description of the flow of the processing performed by the host CPU 200 and the processor device 100 illustrated in the first column from the left of the figure is omitted as it is almost the same as the flows of the processing illustrated in FIG. 3 and FIG. 4. Here, the description shall center on the flow of the control performed by the bus controller 300 illustrated in the second through fourth columns from the left of the figure.

When the processor device 100 receives the sleep request signal 11 from the host CPU 200 during bus access, it asserts the suspension notification signal 21 (S103). When the suspension notification signal 21 is asserted, the bus controller 300 judges whether or not a command request signal 23 has been received from the processor device 100 (whether or not a command request signal 23 is held by the command controlling unit 301) (S121). In the case of judging that the command request signal 23 has been received, the bus controller 300 masks the input of further command request signals 23, and proceeds to S123. On the other hand, in the case of judging that the command request signal 23 has not been received at the time when the command request signal 23 is asserted, the bus controller 300 receives it (S122), then masks the input of command request signals 23, before further proceeding to S123. Following Step S123, the command controlling unit 301 judges whether the received command request is a request for read access or write access (S124).

In the case of judging the received command request as a request for read access, the shared buffer judging unit 306 judges whether or not the shared buffer 305 has available capacity larger than the threshold (S125), and asserts the suspension notification reception signal 22 in the case of judging that the shared buffer 305 has available capacity larger than the threshold (S126). The asserted suspension notification reception signal 22 is notified to the processor device 100 (S127→S128→S105) as well as to the command controlling unit 301 (S127). While asserting the suspension notification reception signal 22, the command executing unit 310 prohibits outputting of a signal responding to the command request signal 23 (that is, a command reception signal 24, a write data reception signal 26, and a read data valid signal 27) to the processor device 100. This is because the processor device 100 cannot recognize such signals while it is in the sleep mode.

The read command request held by the command controlling unit 301 is further outputted to the memory or the I/O by the command arbitrating unit 302 via the memory I/F 1001 or the I/O controlling unit 1002 as an access control signal (S129). Then, the output of read data from the memory or the I/O is waited for (S130).

In addition, when the read data is outputted from the memory or the I/O, the read data is stored in the shared buffer 305 via one of the memory I/F 1001 and the I/O controlling unit 1002, and further via the read data controlling unit 304. Then, the memory I/F 1001 or the I/O controlling unit 1002 is released (S131).

In the case of judging the received command request as a request for write access in S124, the shared buffer judging unit 306 asserts the suspension notification reception signal 22 (S133→S128→S105). The write command request held by the command controlling unit 301 is further outputted to the command arbitrating unit 302. The command arbitrating unit 302 judges whether or not the processor device 100 has already outputted write data to the memory I/F 1001 or the I/O controlling unit 1002 (S135). Then, in the case of judging that the write data has already been outputted, the memory I/F 1001 or the I/O controlling unit 1002 writes the write data to the memory or the I/O unit (S136→S137). On the other hand, in the case of judging that the write data has not yet been outputted, the write access is not executed (S135→S137).

Further, the following shall describe the case where the processor device 100 switches from the sleep mode to the execution mode and negates the suspension notification signal 21.

When the processor device 100 negates the suspension notification signal 21, the command controlling unit 301 or 301a outputs a command reception signal 24 (S113→ S141→S142). In the case of read access, the bus controller 300 outputs read data to the processor device 100 from the shared buffer 305, and waits for a data reception signal 28 from the processor device 100 (S143→S144→S145).

With this, the processor device 100 obtains the read data. Also, in the case of write access, the bus controller 300 judges whether or not the processor device 100 has already outputted write data to the memory I/F 1001 or the I/O controlling unit 1002 (S146). Then, in the case of judging that the write data has already been outputted, it means that the write access is completed, and thus the bus controller 300 takes no action. On the other hand, in the case of judging that the write data has not yet been outputted, the bus controller 300 waits for the write data to be outputted from the processor device 100 (S147). When the write data is outputted, a data reception signal 26 is outputted to the processor device 100 (S148), and the write data is written to the memory via the memory I/F 1001 or to the I/O via the I/O controlling unit 1002 (S149).

In the manner as described, the processor device 100 switches to the sleep mode during bus access, and completes the bus access when the host CPU 200 negates the sleep request signal 11.

As described up to this point, when the processor device 100 in the computer system 1 according to the first embodiment receives the sleep request signal 11, it performs the following: outputs to the bus controller 300 the suspension notification signal 21 indicating a switch to the suspension mode; and after receiving the suspension notification reception signal 22 from the bus controller 300 as a response to the suspension notification signal 21, responds to the sleep request signal 11 with the sleep response signal 12. The suspension notification reception signal 22 is immediately asserted unless the shared buffer 305 has insufficient capacity, and thus it is possible for the processor device 100 to immediately respond to it with the sleep response signal. With this, the responsiveness to the sleep request can be significantly improved, and the power consumption can further be reduced. By receiving the suspension notification signal 21, the bus controller 300 can recognize that the processor device 100 has entered the sleep mode, and thus avoids to output signals that require the processor device 100 in the sleep mode to respond.

Note that the above mentioned suspension notification reception signal 22 may be omitted depending on the situations. For example, the bus controller 300 may omit the suspension notification reception signal 22 in the case where the bus controller 300 has a buffer dedicated for the processor device 100 instead of the shared buffer 305, or in the case where no processor other than the processor device 100 is connected to the bus controller 300 for executing access.

Figure 7:
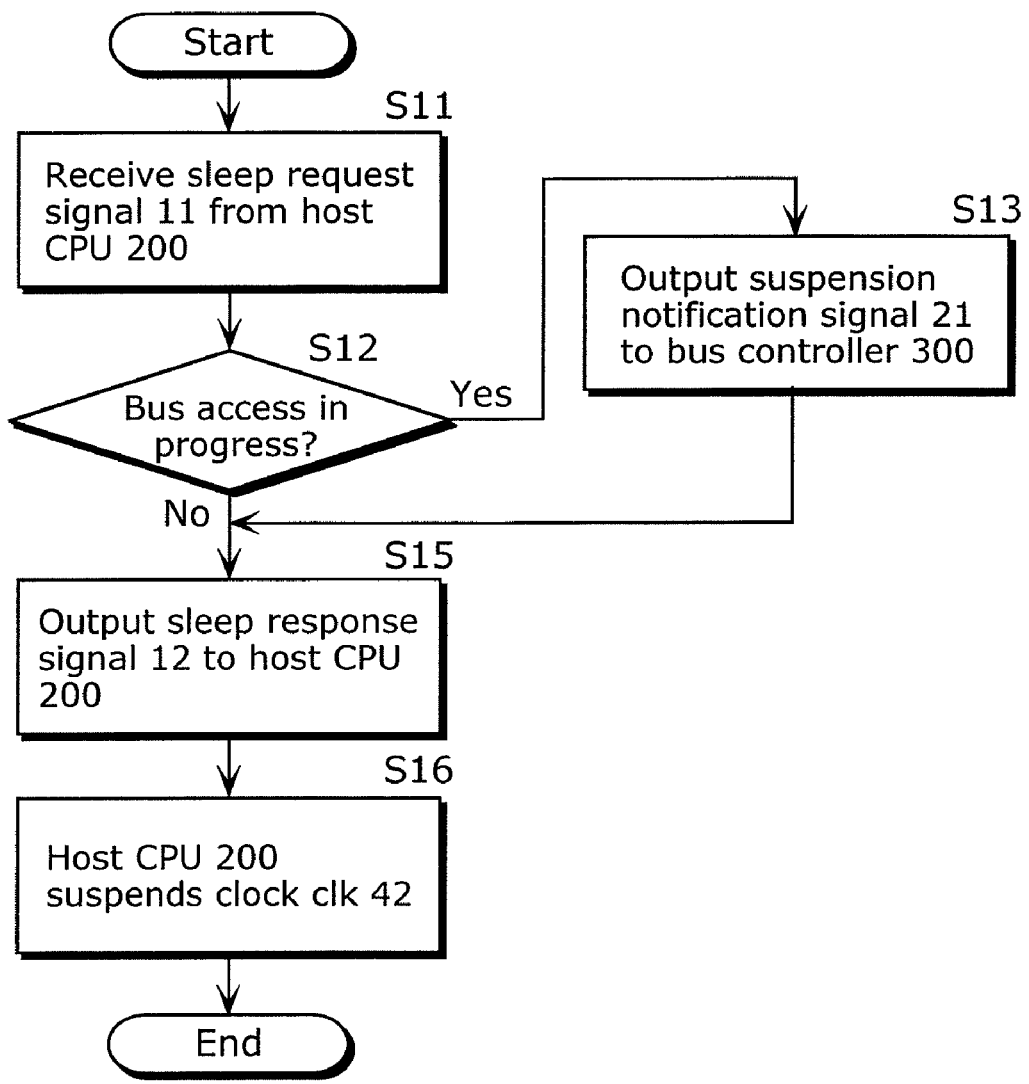
FIG. 7 is a schematic flow chart illustrating processing for switching to the sleep mode in the case where a suspension notification reception signal 22 is omitted.

FIG. 7 is a schematic flow chart illustrating processing for the switch to the sleep mode in the case where the suspension notification reception signal 22 is omitted. This figure is different from FIG. 3 in that Step S14 is removed. Here, the description shall omit the common aspects and center on the different ones with respect to FIG. 3. In FIG. 7, the processor device 100 outputs the sleep response signal 12 to the host CPU 200 immediately after outputting the suspension notification signal 21 to the bus controller 300. By doing so, the time period of the sleep mode matches the time period of the sleep mode requested by the host CPU 200, thereby allowing the maximum reduction in the power consumption requested by the host CPU 200.

Figure 8:
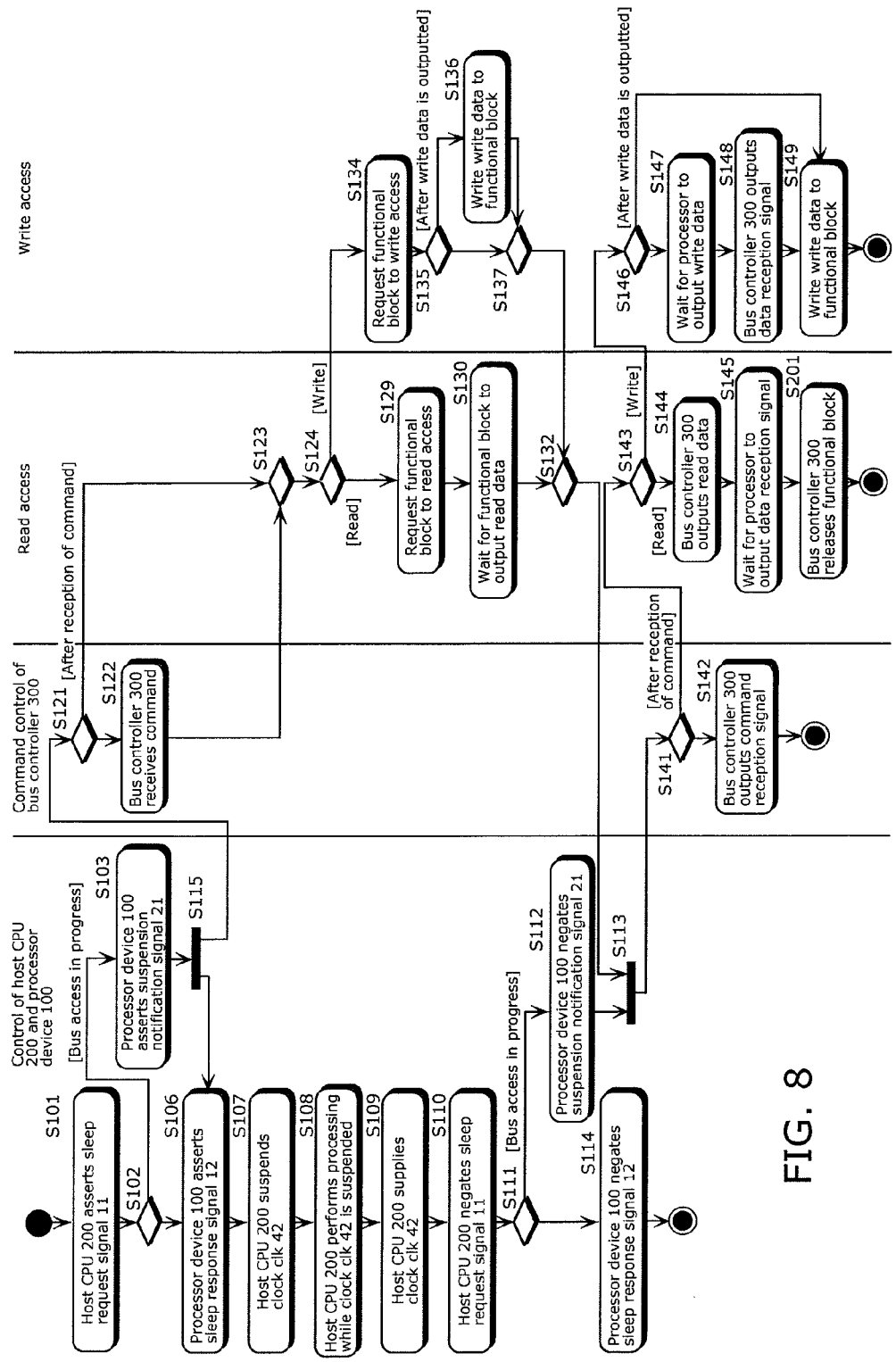
FIG. 8 is a detailed flow chart illustrating processing for switching to the sleep mode in the case where the suspension notification reception signal 22 is omitted.

FIG. 8 is a detailed flow chart illustrating processing for the switch to the sleep mode in the case where the suspension notification reception signal 22 is omitted. This figure is different from FIG. 6 in that Steps S104 and S105 are replaced with Step S115, and that Steps S125 to S128 are removed. Here, the description shall omit the common aspects and center on the different ones with respect to FIG. 6.

In Step S115, the processor device 100 asserts the sleep response signal 12 to the host CPU 200 immediately after asserting the suspension notification signal 21, without receiving the suspension notification reception signal 22. By doing so, it is possible to match the timing to switch to the sleep mode with the timing requested by the host CPU 200.

In addition, since there is no need for the bus controller 300 to respond to the suspension notification reception signal 22, Steps S125 to S128 are removed, thereby allowing a reduction in the circuit size.

Second Embodiment

The following shall describe a computer system according to a second embodiment which includes a processor device 150 having a counter provided external to a processor unit. The processor device 150 is such that when it is in a microsleep mode and the processor unit is in the suspension mode, the clock signal is switched to a lower clock signal, and the counter can count the number of cycles at almost the same or completely the same accuracy as in the operation mode even in the static mode.

Figure 9:
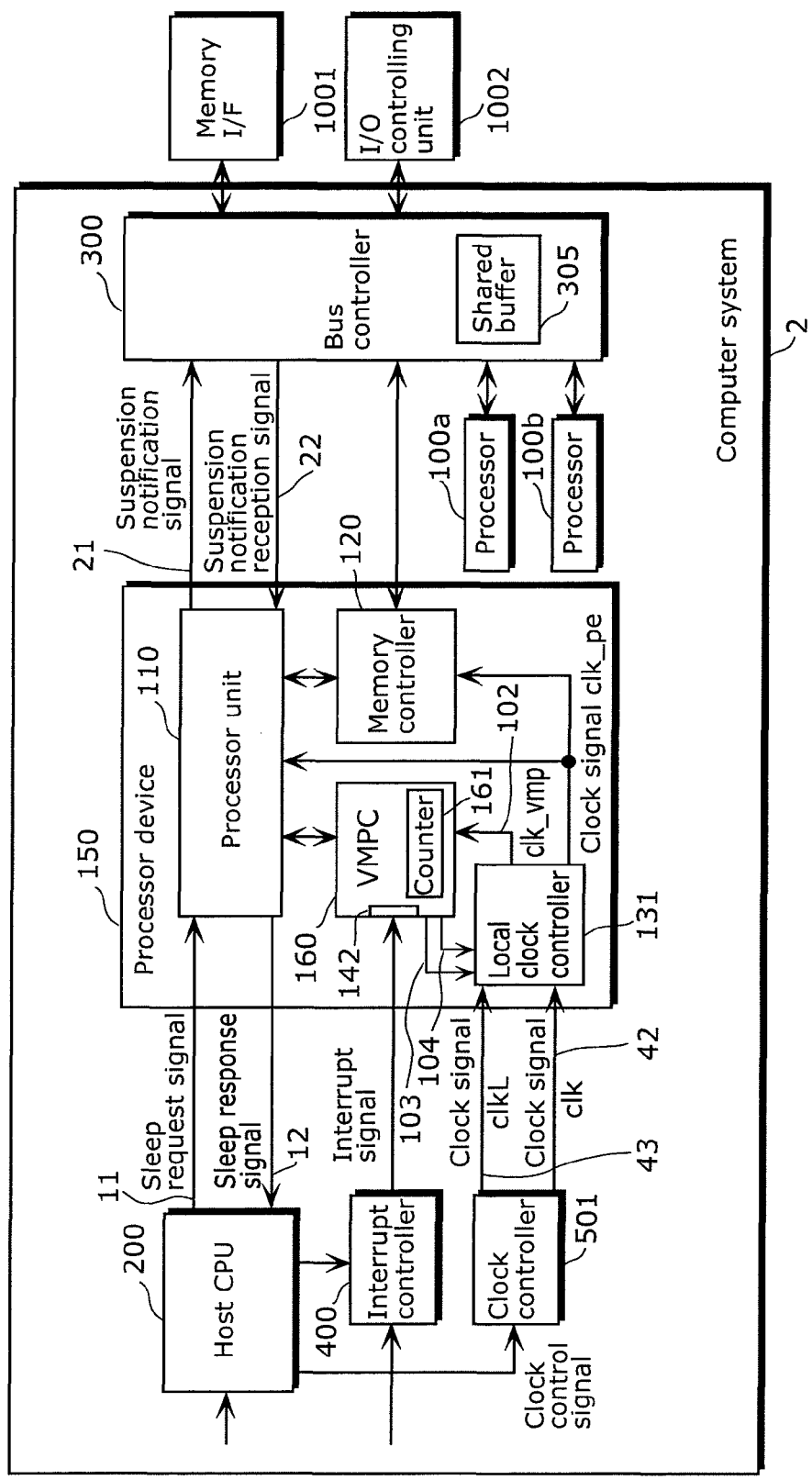
FIG. 9 is a functional block diagram illustrating a structure of a computer system according to a second embodiment.

FIG. 9 is a functional block diagram illustrating an entire structure of the computer system according to the second embodiment of the present invention. A computer system 2 in FIG. 9 is different from the computer system 1 in FIG. 1 in that the computer system 2 includes a processor device 150 and a clock controller 501 instead of the processor device 100 and the clock controller 500. Hereinafter, the description shall omit the common aspects and center on the different ones with respect to FIG. 1.

The clock controller 501 supplies a clock signal clk L43 to the processor device 150, in addition to the clock signal clk 42. The clock signal clk L43 has a cycle K times as long as that of the clock signal clk 42. It is desirable that K is a power of 2. In this case, K is assumed to be 8.

The processor device 150 is different from the processor device 100 in that the processor device 150 includes a local clock controller 131 and a VMP controller 160 instead of the local clock controller 130 and the VMP controller 140.

The local clock controller 131 receives the clock signal clk 42 from the clock controller 501, and supplies a clock signal clk_pe 101 to the processor unit 110 and a clock signal clk_vmp 102 to the VMP controller 160. The clock signal clk_pe 101 has the same frequency as that of the clock signal clk 42, and it is suspended in the suspension mode. The clock signal clk_vmp 102 has the same frequency as that of the clock signal clk 42 (hereinafter referred to as "normal clock") in the operation mode. On the other hand, in the microsleep mode and when the normal clock is not needed, the clock signal clk_vmp 102 has the same frequency as that of the clock signal clk L43 (hereinafter referred to as "slow clock").

The VMP controller 160 is different from the VMP controller 140 in that the VMP controller 160 outputs a microsleep mode signal 103 and a normal clock request signal 104 to the local clock controller 131. The microsleep mode signal 103 is a signal indicating that the processor device 150 is in the microsleep mode. The normal clock request signal 104 is a signal indicating whether to use the clock signal clk 42 or the clock signal clk L43 as the clock signal clk_vmp 102. While the normal clock request signal 104 is asserted, the local clock controller 131 outputs the normal clock signal clk 42 as the clock signal clk_vmp 102.

Figure 10:
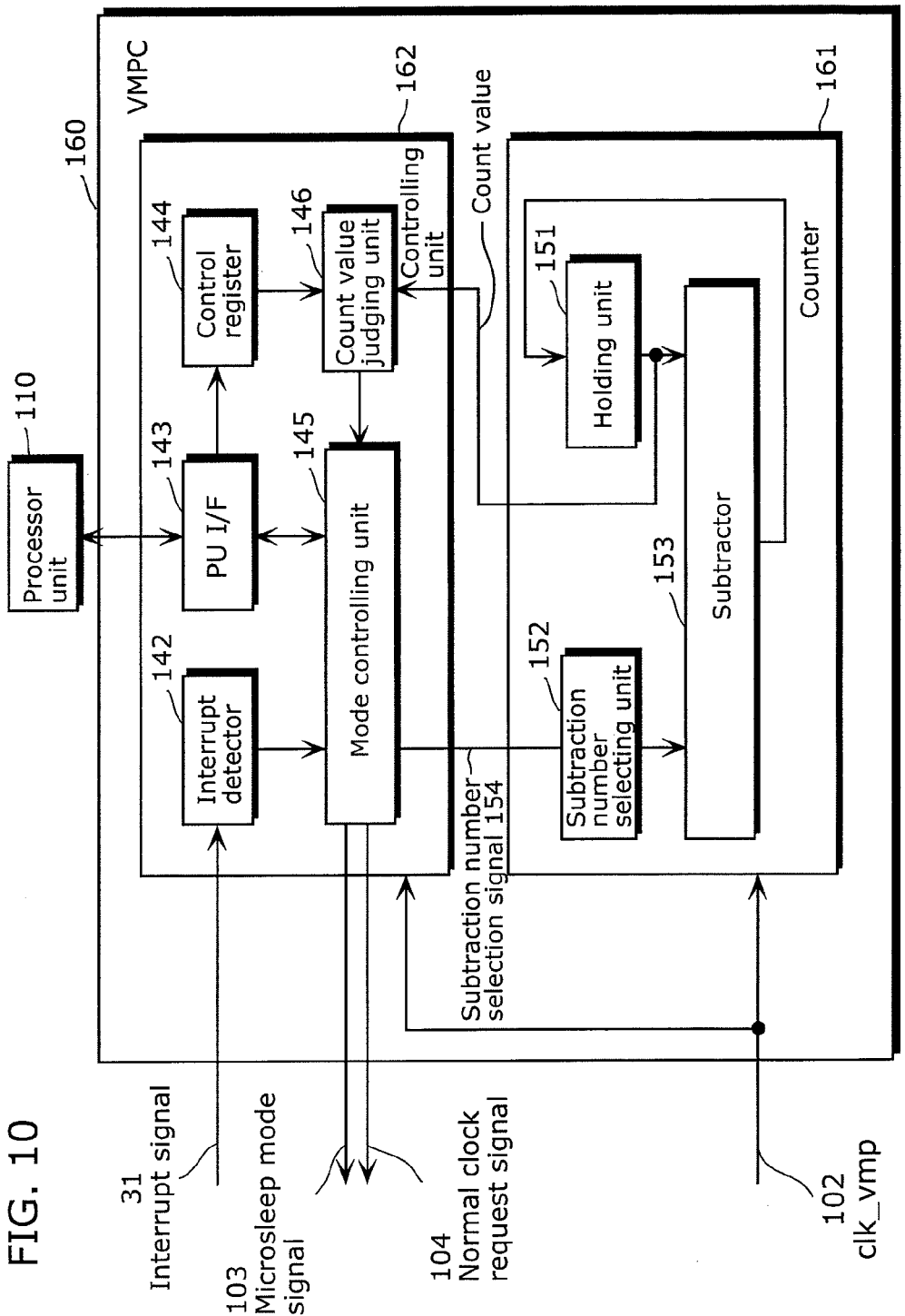
FIG. 10 is a block diagram illustrating a detailed structure of a VMP controller 160.

FIG. 10 is a block diagram illustrating a detailed structure of the VMP controller 160. As the figure shows, the VMP controller 160 includes a counter 161 and a controlling unit 162.

The counter 161 includes a holding unit 151, a subtraction number selecting unit 152, and a subtractor 153, in order to count down the time allocated to the currently executed program to 0.

The holding unit 151 is a register holding the current count value.

A mode controlling unit 145 outputs a subtraction number selection signal 154 to the subtraction number selecting unit 152. The subtraction number selection signal 154 is a signal indicating whether to select 1 or K as the subtraction number. The subtraction number selecting unit 152 selects 1 as the subtraction number when the processor device 150 is in the operation mode, and selects K as the subtraction number when the processor device 150 is in the microsleep mode.

The subtractor 153 subtracts the subtraction number notified by the subtraction number selecting unit 152 from the current count value. The result of the subtraction is held by the holding unit 151.

In this manner, the counter 161 counts down one by one using the clock signal clk 42 when the processor device 150 is in the operation mode, and counts down K by K using the clock signal clk L43 when the processor device 150 is in the microsleep mode and the normal clock request signal 104 is negated indicating that the clock signal L43 is selected. The number of cycles or time counted in the microsleep mode results in being almost the same as the number of cycles or time counted in the operation mode (slower by (K−1) cycles at maximum).

Moreover, the counter 161 is capable of counting down one by one using the normal clock signal clk 42 when the count value of the holding unit 151 becomes less than K in the microsleep mode.

The controlling unit 162 controls the following: the scheduling of a virtual processor brought about by time division multiplexing; the switching of the processor device 150 between the execution mode and the microsleep mode; and the subtraction number and the clock signal of the counter 161. In order to control them, the controlling unit 162 includes an interrupt detector 142, a PUI/F 143, a control register 144, the mode controlling unit 145, and a count value judging unit 146.

The interrupt detector 142 receives an interrupt signal 31 from the interrupt controller 400 so as to detect an interrupt. This interrupt serves as a trigger to stop the microsleep mode.

The PUI/F 143 is an I/F for communication with the processor unit 110. The processor unit 110 accesses the controlling unit 162 via the PUI/F 143.

The control register 144 is a register capable of reading and writing through a program of the processor unit 110. The control register 144 holds a mode flag indicating the operation mode of the counter 161 in the microsleep mode. The mode flag is set by the processor unit 110, and when its flag value is 0, it indicates an operation mode for counting down one by one, instead of K by K using the normal clock signal clk 42 when the count value of the holding unit 151 becomes less than K in the microsleep mode. When its flag value is 1, it indicates prohibition to change the subtraction number from K to 1 when the count value of the counter 161 becomes less than K in the microsleep mode.

The count value judging unit 146 judges whether or not the count value held by the holding unit 151 is greater than K. To be more specific, the count value judging unit 146 negates a count value judgment signal when the count value is greater than K, whereas it asserts the count value judgment signal when the count value is equal to or less than K.

The mode controlling unit 145 controls the mode switching of the processor device 150. The mode switching of the processor device 150 is as illustrated in FIG. 15. The mode controlling unit 145 asserts the microsleep mode signal 103 when the processor device 150 is in the microsleep mode 602. While the processor device 150 is in the microsleep mode 602 and the count value judgment signal is negated (count value>K), the mode controlling unit 145 negates the normal clock request signal 104 (selects the slow clock), and asserts the subtraction number selection signal 154 (causes the subtraction number selecting unit 152 to select the subtraction number K). While the processor device 150 is in the microsleep mode 602 and the count value judgment signal is asserted (count value=<K), the mode controlling unit 145 asserts the normal clock request signal 104 (selects the normal clock), and negates the subtraction number selection signal 154 (causes the subtraction number selecting unit 152 to select the subtraction number 1).

Next, the following shall describe the operations of the computer system 2 according to the second embodiment of the present invention.

Figure 11:
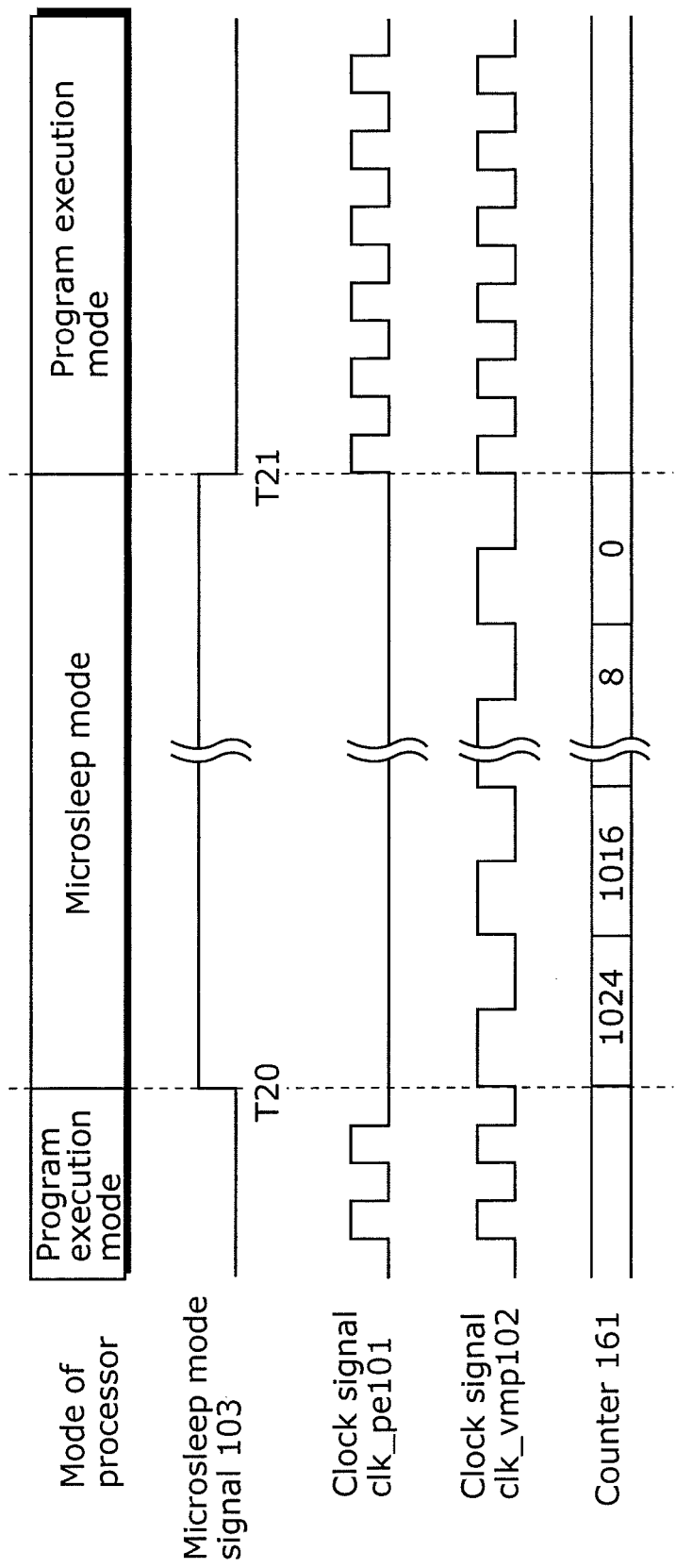
FIG. 11 is a timing chart of the case where context transfer is not performed before and after the processor device switches to the microsleep mode 602.
Figure 12:
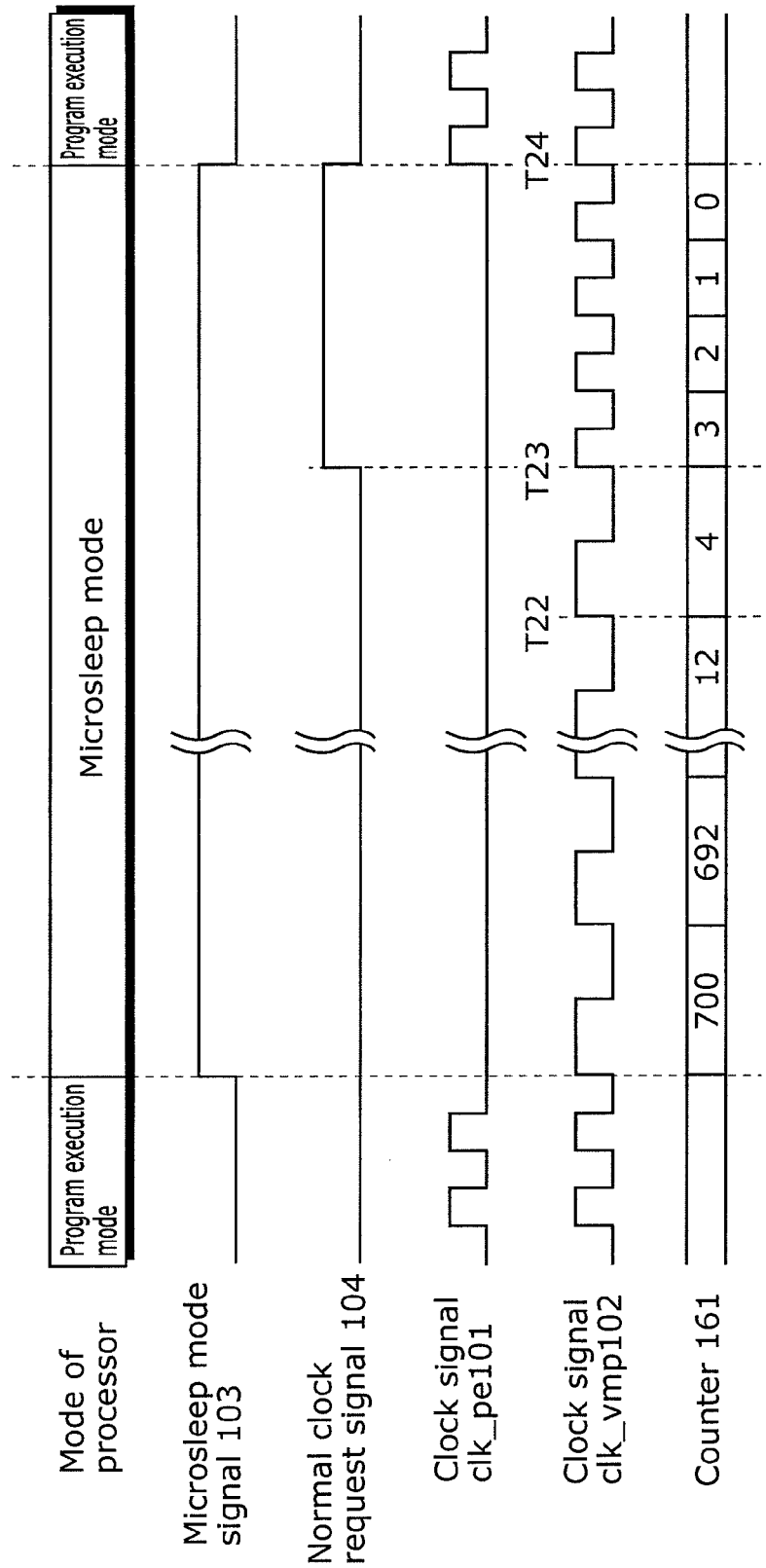
FIG. 12 is a timing chart of the case where the number of cycles of the microsleep mode 602 is not a multiple of 8.

FIG. 11 and FIG. 12 illustrate timing charts of the case where switching of contexts does not take place before and after the processor device 150 switches to the microsleep mode 602. The figures show, from the top, the mode of the processor device 150, the microsleep mode signal 103, the clock signal clk_pe 101, the clock signal clk_vmp 102, and a count value of the counter 161.

The VMP controller 160 starts the operation for causing the processor device 150 to switch to the microsleep mode 602, when it detects that there is no program to be executed by the processor unit 110. In doing so, the VMP controller 160 asserts the microsleep mode signal 103 to be outputted to the local clock controller 131 (at the timing T20 in FIG. 11). FIG. 11 illustrates the case where the remaining number of cycles of the counter 161, which counts the program execution time, is 1024 at this point. When the microsleep mode signal 103 is asserted, the local clock controller 131 suspends the supply of the clock signal clk_pe 101, and switches the clock signal clk_vmp 102 to the clock signal clk L43 to be supplied to the VMP controller 160. Here, it is assumed that the frequency of the clock signal clk L43 is one eighth of the frequency of the clock signal clk 42. The VMP controller 160 counts the remaining time of the program execution time using the clock signal clk_vmp 102. At this point, the number of cycles to be subtracted when the counter 161 performs the counting operation is changed to 8. The reason for changing the number of cycles to be subtracted to 8 is to counterbalance the impact of switching the clock frequency to a low frequency when counting the remaining number of cycles of the program execution.

When the remaining number of cycles of the counter 161 becomes 0, the VMP controller 160 negates the microsleep mode signal 103 (timing T21). When the microsleep mode signal 103 is negated, the local clock controller 131 switches the clock signal clk_pe 101 and the clock signal clk_vmp 102 to the clock signal clk 42.

As describe above, through the operations illustrated in FIG. 11, the time counted in the microsleep mode can approximately match the time counted in the operation mode. This provides an adequate condition for performing real-time processing having strict time restrictions.

Note that in the case where there is no program which can be executed at the timing T21, the processor device 150 continues to be in the microsleep mode. In this case, the processor device 150 switches to the program execution mode when it becomes possible, later on, for another program to be executed.

FIG. 11 illustrates the case where the number of remaining cycles is 1024 which is a multiple of 8. Now, with reference to FIG. 12, the following shall describe the operations in the case where the number of remaining cycles is not a multiple of 8.

FIG. 12 illustrates the case where the number of remaining cycles of the counter 161 is 700. In such case, at the timing T22 when the number of remaining cycles becomes 4 (in other words, when the number of remaining cycles becomes less than 8), the VMP controller 160 asserts the normal clock request signal 104 to be outputted to the local clock controller 131 (timing T23). While the normal clock request signal 104 is asserted, the local clock controller 131 switches the clock signal clk_vmp 102 to the clock signal clk 42. After that, when the number of remaining cycles of the counter 161 becomes 0, the microsleep mode signal 103 and the normal clock request signal 104 are negated (timing T24). When the microsleep mode signal 103 is negated, the local clock controller 131 switches the clock signal clk_pe 101 and the clock signal clk_vmp 102 to the clock signal clk 42, similarly to the operation of FIG. 11.

As described above, through the operation of FIG. 12, the time counted in the microsleep mode can completely match the time counted in the operation mode. As a result, this provides an adequate condition for performing real-time processing having stricter time restrictions.

Next, the following shall describe the case where context is transferred while the processor device 150 is in the microsleep mode 602.

Figure 13:
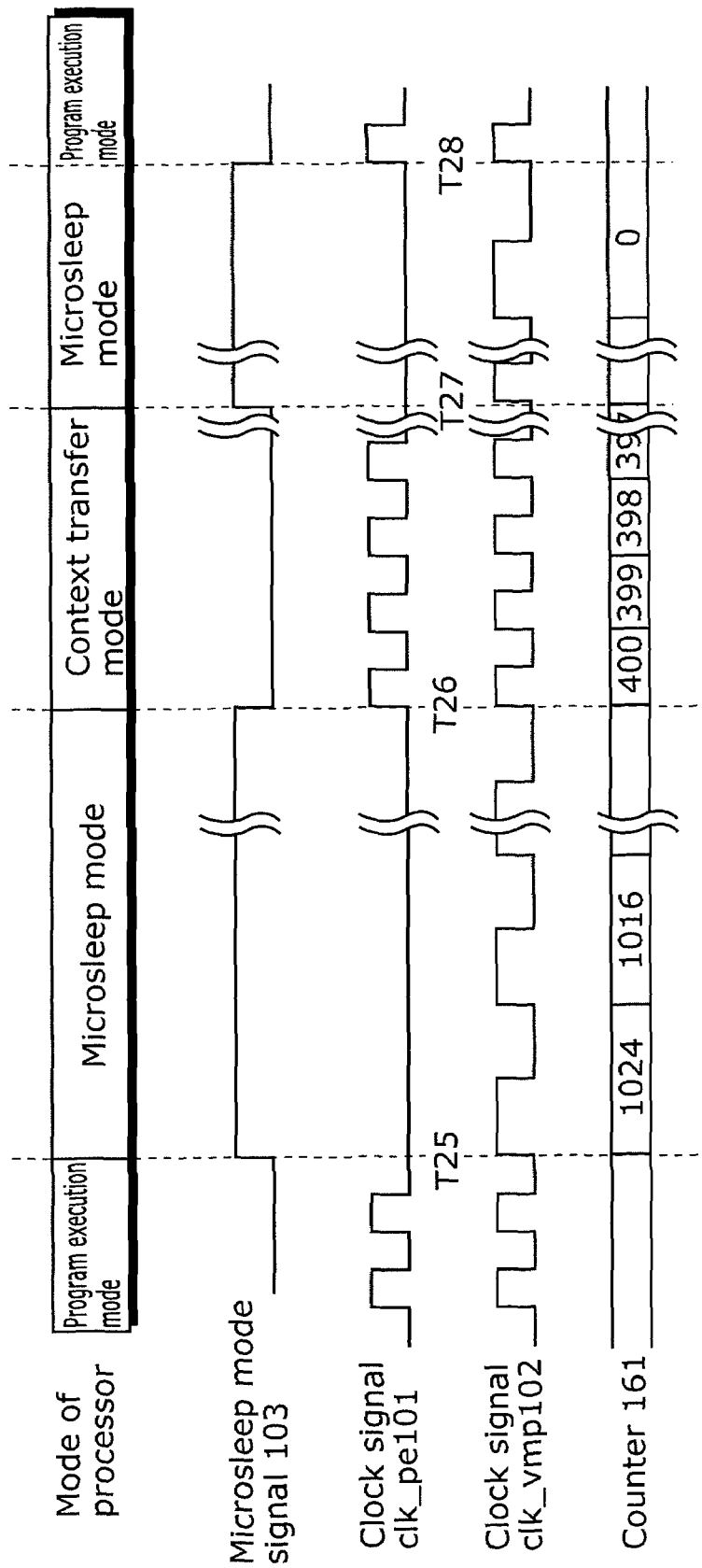
FIG. 13 illustrates a timing chart of the case where context transfer is performed while the processor device 100 is in the microsleep mode 602.

FIG. 13 illustrates a timing chart of the case where context is transferred while the processor device 150 is in the microsleep mode 602.

At the timing T25 of FIG. 13, the processor device 100 switches from the program execution mode 600 to the microsleep mode 602. When context switching is necessary when switching back to the program execution mode 600 at the timing T28, context is transferred during the time between the timing T25 and T28, as illustrated in FIG. 13. The mode for transferring the context is referred to as a context transfer mode 603. In FIG. 13, the context transfer starts at the timing T26 and ends at the timing T27. The start of the context transfer is determined by the VMP controller 160. The VMP controller 160 determines the start of the context transfer as the need arises at the timing, for example, when a period of time elapses since the start of the microsleep mode, or when the count value counted in the microsleep mode becomes a predetermined value. In order to transfer the context, the VMP controller 160 negates the microsleep mode signal 103, and switches the clock signal clk_pe 101 and the clock signal clk_vmp 102 to the clock signal clk 42. In this manner, the context is transferred at high speed at the same frequency as the one at which the processor device 150 executes the program. At the timing T27 when the context transfer is completed, the VMP controller 160 again asserts the microsleep mode signal 103, suspends the supply of the clock signal clk_pe 101, and switches the clock signal clk_vmp 102 to the clock signal clk L43.

As described, since the context transfer is performed at high speed in the microsleep mode using the normal clock signal, it is possible to ensure the processing performance without delaying the start timing of the program to be switched to.

As described, the VMP controller 160 is capable of optimally controlling the clock signal for the counter 161 and for the context transfer in the microsleep mode 602.

Figure 14:
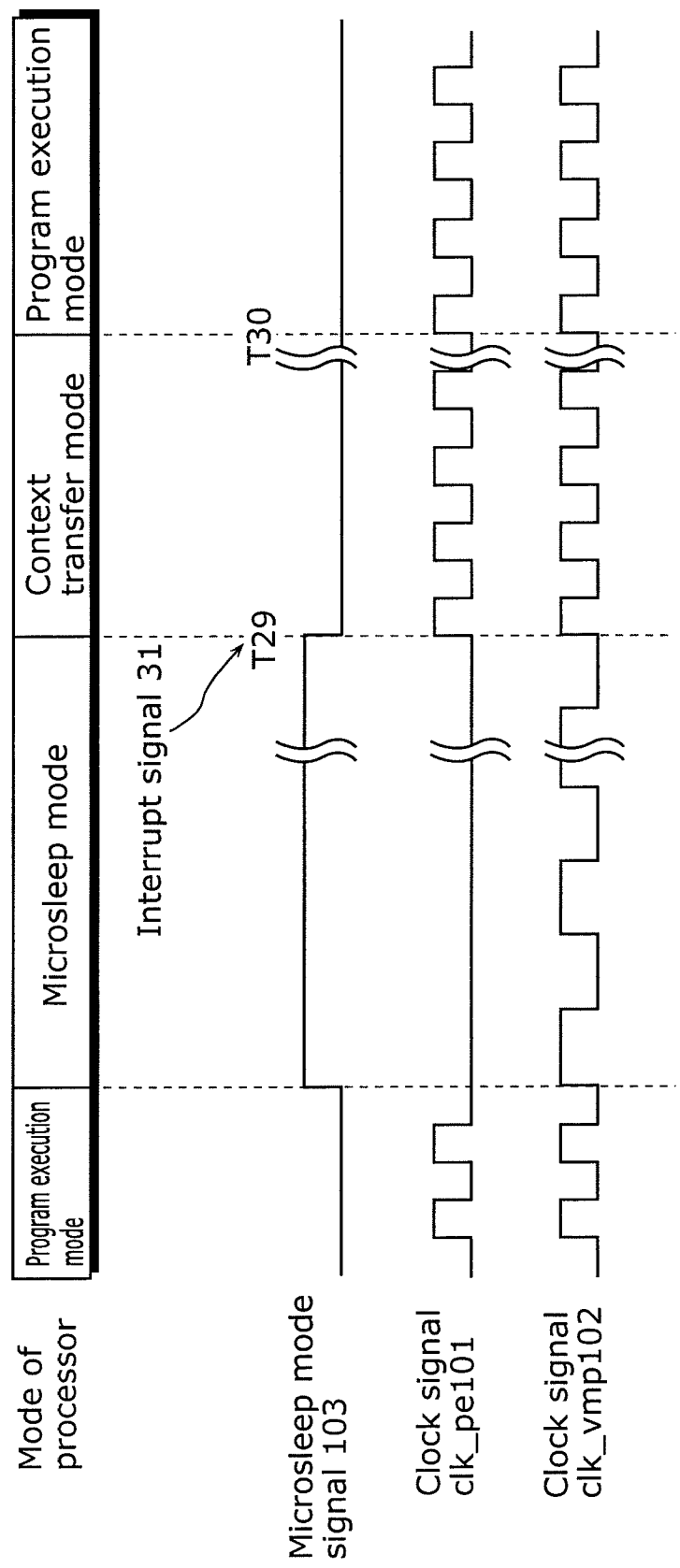
FIG. 14 is a timing chart illustrating an operation of switching to the program execution mode 600 through an interrupt signal.

Further, the processor device 150 also switches to the program execution mode 600 through the interrupt signal 31 being asserted in the microsleep mode 602. A timing chart of FIG. 14 illustrates the operations in such a case. In the case where the context switching is necessary at the timing T29 when the interrupt signal 31 is asserted, the processor device 150 switches to the context transfer mode 603. In the case of switching to the program execution mode 600 through the interrupt signal 31 and the program execution is urgent, the processor device 150 immediately switches to the program execution mode 600 at the timing T30 as illustrated in FIG. 14.

Note that the switching from the program execution mode 602 to the microsleep mode 602 may be performed in the following manner. When the currently executed program completes the necessary processing within the allocated time, the processor unit 110 at first makes a halt while the clock signal is being supplied, and immediately after that, switches to the microsleep mode 602. As a result, the power consumption can be reduced by simply making the halt, and it can be further reduced by suspending the supply of the clock signal.

In the second embodiment, the clock signal clk L43 is supplied from an external unit of the processor device 150. Note, however, that the clock signal clk L43 may be generated within the processor device 150 through frequency division of the clock signal clk 42 within the processor device 150, for example.

Here, the supply of the clock signal to the processor unit 110 and the memory controller 120 is resumed when the processor device 150 is in the context transfer mode 603. However, in the present embodiment where the processor device 150 switches to the context transfer mode 603 while it is in the microsleep mode 602, there is no need to supply the clock signal to the entire processor unit 110 and the entire memory controller 120, since the program is not executed in the context transfer mode 603. Accordingly, the clock signal may be supplied only to the circuit involved in the context transfer.

Note that in the case where the processing is not urgent and a program, for which the reduction of power consumption is a priority higher than the real-time execution thereof, is to be executed, the following is also possible: to count the number of cycles of the context transfer mode 603 and the microsleep mode 602 using the clock signal clk L43 without switching the above described clock signal clk_vmp 102 to the clock signal clk 42. For this selection, the VMP controller 160 may have a selection register, and the user may make the setting by software.

Third Embodiment

Figure 16:
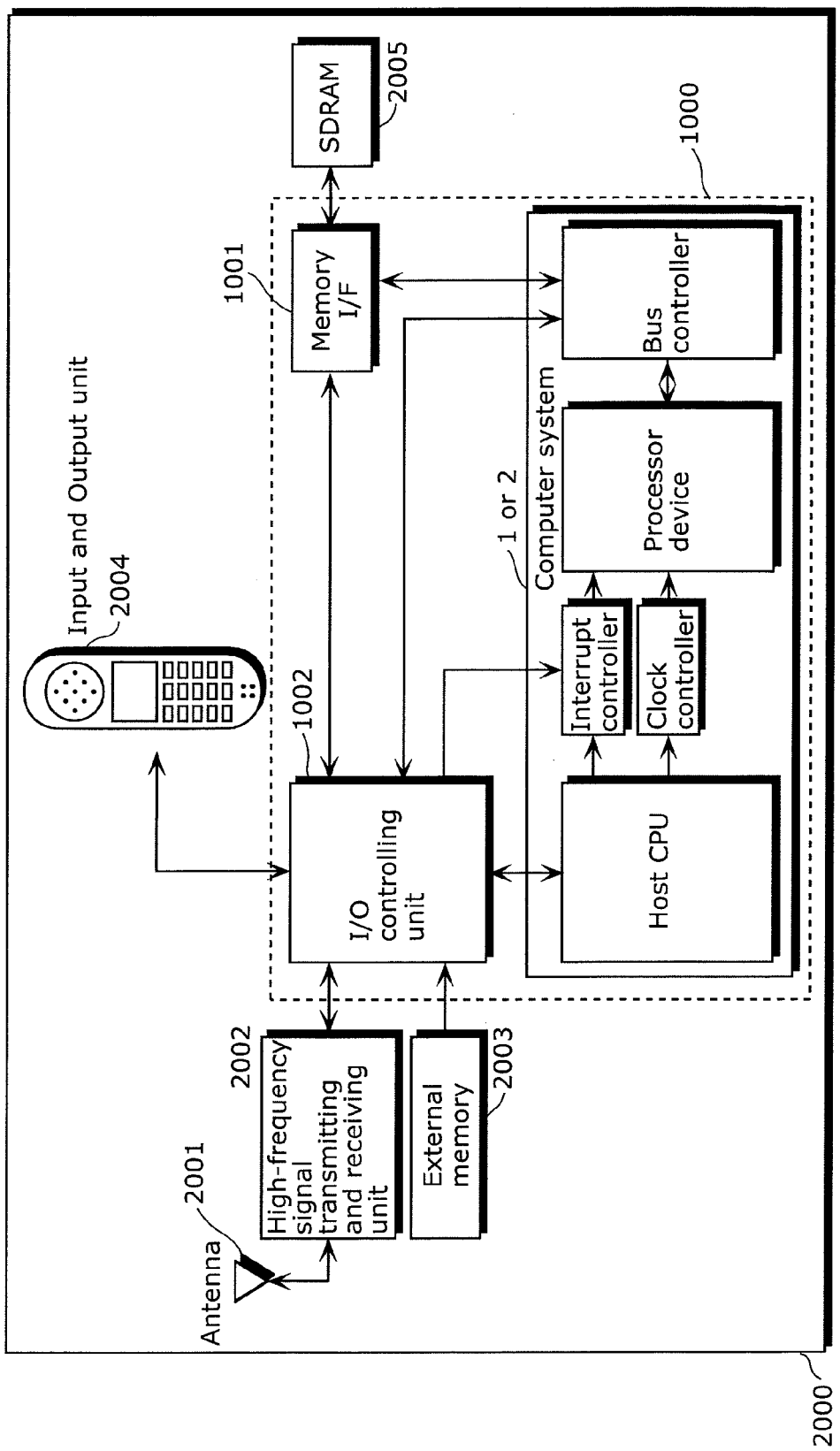
FIG. 16 is a functional block diagram illustrating a structure of a music reproduction function-equipped mobile phone apparatus 2000 for which a computer system according to a third embodiment is used.

FIG. 16 is a functional block diagram illustrating an entire structure of a music reproduction function-equipped mobile phone device 2000 for which a computer system according to a third embodiment of the present invention is used.

As FIG. 16 illustrates, the music reproduction function-equipped mobile phone device 2000 includes a system LSI 1000, an antenna 2001, a high-frequency signal transmitting and receiving unit 2002, an external memory 2003, an input and output unit 2004, and an SDRAM 2005.

The system LSI 1000 includes the computer system 1 illustrated in the first embodiment or the computer system 2 illustrated in the second embodiment, the memory I/F 1001, and the I/O controlling unit 1002.

At first, the I/O controlling unit 1002 reads music data accumulated in the external memory 2003, and stores the music data in the SDRAM 2005. In order to reproduce the music data, the processor device 100 reads the music data from the SDRAM 2005, and reproduces it. The reproduced data is again stored in the SDRAM 2005.

The reproduced data accumulated in the SDRAM 2005 is read again by the I/O controlling unit 1002 via the memory I/F 1001, and is transmitted to the input and output unit 2004. The input and output unit 2004 is in a mobile phone with a built-in speaker. The user can listen to the reproduced music through the built-in speaker of the input and output unit 2004.

During the reproduction of the music data, the processor device 100 is not always in an operation, and there is a time period during which no program execution is needed. During such a time period, the processor device 100 is caused to switch to the microsleep mode 602 for the purpose of reducing the power consumption of the mobile phone.

The method for switching to the microsleep mode 602 is as described in the second embodiment.

The following shall describe the operation performed by the music reproduction function-equipped mobile phone device 2000 in the case where radio waves for communication are received from the antenna 2001 while the processor device 100 is in the microsleep mode 602.

When radio waves for communication are received from the antenna 2001, the high-frequency signal transmitting and receiving unit 2002 detects this, and notifies the I/O controlling unit 1002 of the detection. Here, the I/O controlling unit 1002 outputs an interrupt signal to the interrupt controller 400. Then, the interrupt controller 400 outputs an interrupt signal to the processor device 100. When the interrupt signal is received, the processor device 100 at first switches from the microsleep mode 602 to the context transfer mode 603 so as to switch to the program execution mode 600 and perform communication. After transferring the context for the communication, the processor device 100 switches to the program execution mode 600. The method for controlling the clock signal when the processor device 100 switches to the context transfer mode 603 is as described in the second embodiment.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is suitable for computer systems including a processor device having an execution mode for receiving a supply of a clock signal and a suspension mode in which the supply of the clock signal is suspended by responding, with a sleep response signal, to a sleep request signal received from an external device. The present invention is especially useful for appliances such as mobile phones for which a high level of power consumption reduction is required.

What is claimed is:

1. A computer system comprising:
 a host Central Processing Unit (CPU) that transmits a sleep request signal;
 a processor having an execution mode and a suspension mode, the execution mode being a mode for executing a program, and the suspension mode being a mode for suspending the program execution by transmitting a sleep response signal to the host CPU, in response to a sleep request signal received from the host CPU; and an access controller configured to access a functional block in response to a command request issued by said processor, and to assert, to said processor, a command reception signal responding to the command request, wherein, in response to the sleep request signal from the host CPU, said processor transmits the sleep response signal to the host CPU, and asserts, to said access controller, a suspension notification signal indicating a switch to the suspension mode, the suspension notification signal being functionally distinct from the sleep response signal, and when the suspension notification signal is received from the processor, said access controller is configured to withhold asserting the command reception signal to said processor as a response to the command request.

2. The computer system according to claim 1, wherein said access controller includes a mask configured to mask an input of a command request, and through which said access controller is configured:

to mask, when said processor has output the command request when said access controller receives the suspension notification signal, an input of a further command request after receiving the command request from said processor;

to mask an input of a command request when said processor has not output the command request when said access controller receives the suspension notification signal; and to remove the mask when the suspension notification signal is negated.

3. The computer system according to claim 1, wherein supply of a clock signal to said processor is suspended in the suspension mode.

4. The computer system according to claim 1, wherein said access controller is configured to assert a suspension notification reception signal to said processor in response to the suspension notification signal from said processor, and when said processor has received the sleep request signal and is waiting to receive the command reception signal from said access controller, said processor responds with the sleep response signal after receiving the suspension notification reception signal from said access controller as a response to the suspension notification signal.

5. The computer system according to claim 1, further comprising:

a clock supplier configured to supply a clock signal to said processor, wherein, the host CPU is configured to assert the sleep request signal to said processor, and to receive the sleep response signal from said processor, and in response to the sleep response signal, said host CPU is configured to control said clock supplier so that said clock supplier suspends the supply of the clock signal.

6. The computer system according to claim 5, wherein said host CPU is further configured to control said clock supplier so that said clock supplier resumes the supply of the clock signal, and to negate the sleep request signal.

7. The computer system according to claim 4, wherein said access controller includes:

a command executor configured to receive the command request from said processor and from at least an other processor, and to execute access in response to the received command requests;

a shared buffer which holds read data accessed in response to the command request; and a judger configured to judge whether or not an available capacity of said shared buffer is equal to or greater than a threshold, and to defer the assertion of the suspension notification reception signal to said processor when it is judged that the available capacity is equal to or less than the threshold and the suspension notification signal is received.

8. The computer system according to claim 1, wherein, when the sleep request signal is negated and said processor is waiting to receive the command reception signal, said processor receives the command reception signal from said access controller.

9. A computer system comprising:

a processor device having an execution mode and a first suspension mode, the execution mode being a mode for receiving supply of a first clock signal, the first suspension mode being a mode in which the supply of the first clock signal is suspended by responding, with a sleep response signal, to a sleep request signal;

a first clock supplier configured to supply the first clock signal to said processor device;

a host Central Processing Unit (CPU) configured to assert the sleep request signal to said processor device, and to cause said first clock supplier to suspend the supply of the first clock signal to said processor device when the sleep response signal is received as a response to the sleep request signal; and an access controller configured to access a functional block in response to a command request issued by said processor device, and to assert, to said processor device, a command reception signal after the access is completed, wherein said processor device:

asserts the sleep response signal when the processor device receives the sleep request signal and is not waiting to receive the command reception signal from said access controller; and responds to the sleep request with the sleep response signal and asserts, to said access controller, a suspension notification signal indicating a switch to the first suspension mode, when the processor device receives the sleep request signal and is waiting to receive the command reception signal from said access controller, said processor device includes:

a processor having the execution mode and a second suspension mode, the execution mode being a mode in which programs are executed by time division multiplexing and the first clock signal is supplied, the second suspension mode being a mode in which the supply of the first clock signal is suspended;

a counter configured to count a time period allocated to a currently executed program;

a controller configured to control switching of said processor between the execution mode and the second suspension mode; and a second clock supplier configured to receive the first clock signal from said first clock supplier, and to supply the first clock signal and a second clock signal having a cycle K times as long as a cycle of the first clock signal, said controller is configured to control said second clock supplier so that said processor is switched to the second suspension mode when a remaining time of said counter is other than 0 and the currently executed program has completed necessary processing within the allocated time period, said second clock supplier is configured, in the second suspension mode, to suspend the supply of the first clock signal to said processor and to supply the second clock signal to said counter and said controller, and said counter is configured to count one by one in the execution mode, and K by K in the second suspension mode.

10. A processor device comprising, a processor having an execution mode and a suspension mode, the execution mode being a mode in which programs are executed by time division multiplexing and a first clock signal is supplied, and the suspension mode being a mode in which the supply of the first clock signal is suspended;

a counter configured to count a time period allocated to a currently executed program;

a controller configured to control switching of said processor between the execution mode and the suspension mode; and a clock supplier configured to supply the first clock signal and a second clock signal having a cycle K times as long as a cycle of the first clock signal, wherein said controller is configured to control said clock supplier so that said processor is switched to the suspension mode when a remaining time of said counter is other than 0 and the currently executed program has completed necessary processing within the allocated time period, said clock supplier is configured, in the suspension mode, to suspend the supply of the first clock signal to said processor and to supply the second clock signal to said counter and said controller, and said counter is configured to count one by one in the execution mode, and K by K in the suspension mode.

11. The processor device according to claim 10, wherein said controller is further configured to switch the second clock signal to the first clock signal when a count value of said counter becomes less than K in the suspension mode, the second clock signal being supplied from said clock supplier to said counter, and said counter is further configured, when the count value becomes less than K, to change a subtraction number from K to 1 so as to subtract the count value one by one in the suspension mode.

12. The processor device according to claim 11,
wherein K is a power of 2.

13. The processor device according to claim 11,
wherein said controller includes a control register which can be set by said processor, and while said control register holds a predetermined flag value, said controller does not switch from the second clock signal to the first clock signal and said counter does not change the subtraction number from K to 1 when the count value of said counter becomes less than K in the suspension mode.

14. The processor device according to claim 10, wherein said controller is further configured, in the suspension mode:

to temporarily switch the second clock signal to the first clock signal and cause said clock supplier to temporarily supply the first clock signal to said processor, the second clock signal being supplied from said clock supplier to said counter;

to instruct said processor to execute context transfer; and to switch, when the context transfer is completed, the first clock signal back to the second clock signal and to cause said clock supplier to suspend the supply of the first clock signal to said processor, the first clock signal being supplied from said clock supplier to said counter.

15. A method for controlling a computer system that includes a host Central Processing Unit (CPU);

a processor having an execution mode and a suspension mode, the execution mode being a mode for receiving supply of a clock signal, and the suspension mode being a mode in which the supply of the clock signal is suspended by responding, with a sleep response signal, to a sleep request signal received from the host CPU, and an access controller which accesses a functional block in response to a command request issued by the processor, and asserts a command reception signal to the processor after the access is completed, the method comprising:

receiving, by the processor, the sleep request signal transmitted by the host CPU;

judging, by the processor, when the sleep request signal is received, whether or not the processor is waiting to receive the command reception signal;

transmitting, by the processor, the sleep response signal to the host CPU when it is judged in the judging that the processor is not waiting to receive the command reception signal; and transmitting, by the processor, the sleep response signal to the host CPU and asserting, by the processor, a suspension notification signal to the access controller when it is judged in the judging that the processor is waiting to receive the command reception signal, the suspension notification signal indicating a switch to the suspension mode, the suspension notification signal being functionally distinct from the sleep response signal.

16. A system Large-Scale Integration (LSI) comprising a processor device according to claim 10.

17. A mobile phone comprising a computer system according to claim 9, in which a host Central Processing Unit (CPU) is configured to control voice communication.

\* \* \* \* \*